(12) United States Patent
Davis et al.

(10) Patent No.: US 11,086,010 B2
(45) Date of Patent: Aug. 10, 2021

(54) SOFTWARE DEFINED AUTOMOTIVE RADAR SYSTEMS

(71) Applicant: UHNDER, INC., Austin, TX (US)

(72) Inventors: Curtis Davis, St. Louis, MO (US);
Monier Maher, St. Louis, MO (US);
Jean P. Bordes, St. Charles, MO (US);
Manju Hegde, St. Louis, MO (US);
Otto A. Schmid, Morgantown, WV (US); Raghunath K. Rao, Austin, TX (US); Marius Goldenberg, Austin, TX (US); Aria Eshraghi, Austin, TX (US);
Vito Giannini, Austin, TX (US); David S. Trager, Buda, TX (US); Nikhilesh Bhagat, Austin, TX (US); Srikanth Gollapudi, Austin, TX (US); Sundar Govindarajan, Chennai (IN); Steve Borho, St. Charles, MO (US);
Jonathan Preussner, Austin, TX (US);
Paul W. Dent, Pittsboro, NC (US);
Paul Bassett, Austin, TX (US);
Stephen W. Alland, Newbury Park, CA (US); Fred Harris, Lemon Grove, CA (US); Wayne E. Stark, Ann Arbor, MI (US); Murtaza Ali, Cedar Park, TX (US)

(73) Assignee: Uhnder, Inc., Austin, TX (US)

( * ) Notice: Subject to any disclaimer, the term of this patent is extended or adjusted under 35 U.S.C. 154(b) by 185 days.

(21) Appl. No.: 16/207,910

(22) Filed: Dec. 3, 2018

(65) Prior Publication Data
US 2019/0094353 A1    Mar. 28, 2019

Related U.S. Application Data

(63) Continuation of application No. 15/844,994, filed on Dec. 18, 2017, now Pat. No. 10,145,954, which is a
(Continued)

(51) Int. Cl.
*G01S 13/931*    (2020.01)
*G01S 7/02*    (2006.01)
(Continued)

(52) U.S. Cl.
CPC ............ *G01S 13/931* (2013.01); *G01S 7/023* (2013.01); *G01S 13/87* (2013.01); *G01S 13/878* (2013.01);
(Continued)

(58) Field of Classification Search
CPC .............................. G01S 13/584; G01S 13/64
(Continued)

(56) References Cited

U.S. PATENT DOCUMENTS 1,882,128 A    10/1932    Fearing
3,374,478 A     3/1968    Blau
(Continued)

FOREIGN PATENT DOCUMENTS

EP    0725480    11/2011
EP    2374217     4/2013
(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Marcus E Windrich
(74) *Attorney, Agent, or Firm* — Gardner Linn

(57) ABSTRACT

A radar system processes signals in a flexible, adaptive manner to determine range, Doppler (velocity) and angle of objects in an environment. The radar system processes the received signal to achieve different objectives depending on
(Continued)

one or more of a selected range resolution, a selected velocity resolution, and a selected angle of arrival resolution, as defined by memory requirements and processing requirements. The system allows improved resolution of range, Doppler and/or angle depending on the memory requirements and processing requirements. The system also adapts to changing environmental conditions including interfering radio signals.

21 Claims, 15 Drawing Sheets

Related U.S. Application Data continuation of application No. 15/496,313, filed on Apr. 25, 2017, now Pat. No. 9,846,228, which is a continuation-in-part of application No. 15/481,648, filed on Apr. 7, 2017, now Pat. No. 9,689,967.

(60) Provisional application No. 62/327,018, filed on Apr. 25, 2016, provisional application No. 62/327,016, filed on Apr. 25, 2016, provisional application No. 62/327,004, filed on Apr. 25, 2016, provisional application No. 62/327,003, filed on Apr. 25, 2016, provisional application No. 62/327,005, filed on Apr. 25, 2016, provisional application No. 62/327,017, filed on Apr. 25, 2016, provisional application No. 62/327,015, filed on Apr. 25, 2016, provisional application No. 62/327,006, filed on Apr. 25, 2016, provisional application No. 62/319,613, filed on Apr. 7, 2016.

(51) Int. Cl.
| | | |
|---|---|---|
| *G01S 13/87* | (2006.01) | |
| *H04L 27/227* | (2006.01) | |
| *G01S 7/35* | (2006.01) | |
| *H04B 17/309* | (2015.01) | |
| *H04B 17/345* | (2015.01) | |

(52) U.S. Cl.
CPC .... *H04L 27/2278* (2013.01); *G01S 2007/356* (2013.01); *G01S 2013/9316* (2020.01); *G01S 2013/9322* (2020.01); *G01S 2013/93271* (2020.01); *G01S 2013/93272* (2020.01); *H04B 17/309* (2015.01); *H04B 17/345* (2015.01); *H04B 2201/71634* (2013.01)

(58) Field of Classification Search
USPC ...................................................... 342/70–72
See application file for complete search history.

(56) References Cited

U.S. PATENT DOCUMENTS

| | | |
|---|---|---|
| 3,735,398 A | 5/1973 | Ross |
| 3,750,169 A | 7/1973 | Strenglein |
| 3,896,434 A | 7/1975 | Sirven |
| 4,078,234 A | 3/1978 | Fishbein et al. |
| 4,176,351 A | 11/1979 | De Vita et al. |
| 4,566,010 A | 1/1986 | Collins |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,888,491 B2 | 5/2005 | Richter |
| 6,975,246 B1 | 12/2005 | Trudeau |
| 7,119,739 B1 | 10/2006 | Struckman |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 * | 2/2010 | Toennesen ............ G01S 13/931 342/70 |
| 7,728,762 B2 | 6/2010 | Sakamoto |
| 7,791,528 B2 * | 9/2010 | Klotzbuecher ....... G01S 13/347 342/112 |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,212,713 B2 | 7/2012 | Aiga et al. |
| 8,330,650 B2 | 12/2012 | Goldman |

(56) References Cited

U.S. PATENT DOCUMENTS

| | | |
|---|---|---|
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1 | 9/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1* | 1/2004 | Schiffmann ............ G01S 13/878 342/70 |
| 2004/0015529 A1 | 1/2004 | Tanrikulu et al. |
| 2004/0066323 A1* | 4/2004 | Richter ................... G01S 13/22 342/70 |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0069162 A1 | 3/2005 | Haykin |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1* | 11/2006 | Bonthron ................ G01S 13/44 342/70 |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1* | 7/2007 | Woodington ........ G01S 13/528 342/70 |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1* | 8/2007 | Zeng ................... G01S 13/723 342/174 |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1* | 8/2011 | Nickolaou ........ B60W 30/0953 701/31.4 |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1* | 12/2011 | De Mersseman ..... G01S 13/931 342/70 |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |

(56) References Cited

U.S. PATENT DOCUMENTS

| | | |
|---|---|---|
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2014/0350815 A1* | 11/2014 | Kambe .............. B60W 10/184 701/70 |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1* | 8/2015 | Rosenblum .............. G01S 13/86 342/71 |
| 2015/0247924 A1 | 9/2015 | Kishigami |
| 2015/0255867 A1 | 9/2015 | Inoue |
| 2015/0301172 A1* | 10/2015 | Ossowska .............. G01S 13/878 342/70 |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Oscar Faus Garcia, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01. pdf.

* cited by examiner

SOFTWARE DEFINED AUTOMOTIVE RADAR SYSTEMS

CROSS REFERENCE TO RELATED APPLICATIONS

The present application is a continuation application of U.S. patent application Ser. No. 15/844,994, filed Dec. 18, 2017, now U.S. Pat. No. 10,145,954, which is a continuation of Ser. No. 15/496,313, filed Apr. 25, 2017, now U.S. Pat. No. 9,846,228, which claims the filing benefits of U.S. provisional applications, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, 62/327,017, filed Apr. 25, 2016, and Ser. No. 62/327,018, filed Apr. 25, 2016; and U.S. patent application Ser. No. 15/496,313 is a continuation-in-part of U.S. patent application, Ser. No. 15/481,648, filed Apr. 7, 2017, now U.S. Pat. No. 9,689,967, which claims the filing benefits of U.S. provisional applications, Ser. No. 62/319,613, filed Apr. 7, 2016, and Ser. No. 62/327,003, filed Apr. 25, 2016, which are all hereby incorporated by reference herein in their entireties.

FIELD OF THE INVENTION

The present invention is directed to radar systems, and in particular to radar systems for vehicles.

BACKGROUND OF THE INVENTION

The use of radar to determine range, velocity, and angle (elevation or azimuth) of objects in an environment is important in a number of applications including automotive radar and gesture detection. A radar typically transmits a radio frequency (RF) signal and listens for the reflection of the radio signal from objects in the environment. A radar system estimates the location and velocity of objects, also called targets, in the environment by comparing the received radio signal with the transmitted radio signal. It would be advantageous to have a radar system that can adapt various aspects of the radar transmitted signal and receiver processing to different environments and different objective functions.

SUMMARY OF THE INVENTION

The present invention provides methods and a radar system that can operate under a variety of environments, a variety of external information, and with a variety of objective functions to modify the transmission and reception processing at a given time to optimize the system with respect to a given objective function. The invention accomplishes better performance by adaptively changing the system including changing the transmitted signal characteristics such as the baseband signal, the bandwidth, the frequency, and the power and the set of transmitting antennas that are used. Better performance is also obtained by changing the receiver processing including the receiving antennas, interference mitigation techniques to be employed, length of time of the signal used to process a received signal to determine range.

A radar sensing system for a vehicle in accordance with an embodiment of the present invention includes a plurality of transmitters, a plurality of receivers, a memory, and a control unit. The plurality of transmitters is configured for installation and use on a vehicle and operable to or configured to transmit modulated radio signals. The plurality of receivers are configured for installation and use on the vehicle and operable to or configured to receive radio signals that are transmitted radio signals reflected from an object in the environment. Each transmitter of the plurality of transmitters comprises a digital processing unit, a digital-to-analog converter, an analog processing unit, and a transmit antenna. Each receiver of the plurality of receivers comprises a receive antenna, an analog processing unit, an analog-to-digital converter, a digital front end processing unit, and a digital back end processing system. The control unit is operable to or configured to select an operating mode and to modify the plurality of transmitters and the plurality of receivers. Range information data produced by the digital front end processing unit is stored in the memory and then processed by the digital back end processor, as directed by the control unit. The range information data, which includes range information of objects in the environment, is stored in the memory for different receivers and for different scans. The processing of the range information data is controlled by the control unit.

A method for operating a dynamically adaptable, modulated continuous wave vehicular radar system in accordance with an embodiment of the present invention. The method includes providing a transmitter and a receiver, both configured for installation and use on a vehicle. The transmitter is operable to or configured to transmit a modulated radio signal. The receiver is operable to or configured to receive a radio signal that is a transmitted radio signal reflected from an object in the environment. The receiver comprises a dynamically adaptable digital front end processor and a dynamically adaptable digital back end processor. In response to environmental conditions and an operational status, an operating mode and a modification of an operational parameter of at least one of the transmitter and the receiver are selected, the selection depending on a need for one of a best range resolution and a best velocity resolution. Range information data is stored into memory that was produced by the digital front end processing unit. The digital back end processor is directed to process a selected portion of the range information data, based upon the selected operating mode.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention may achieve better performance from a radar system when there is a near object and a far object. Exemplary embodiments of the present invention accomplish better performance by adjusting the radar system to the environment, the objective and inputs external to the radar system. The invention accomplishes better performance by adapting the radar system under software control.

The radar sensing system of the present invention may utilize aspects of the radar systems described in U.S. Pat. Nos. 9,575,160 and/or 9,599,702, and/or U.S. patent applications, Ser. No. 15/416,219, filed Jan. 26, 2017, now U.S. Pat. No. 9,772,397, and/or Ser. No. 15/292,755, filed Oct. 13, 2016, now U.S. Pat. No. 9,753,121, and/or U.S. provisional applications, Ser. No. 62/382,857, filed Sep. 2, 2016, and/or Ser. No. 62/381,808, filed Aug. 31, 2016, which are all hereby incorporated by reference herein in their entireties.

Figure 1:
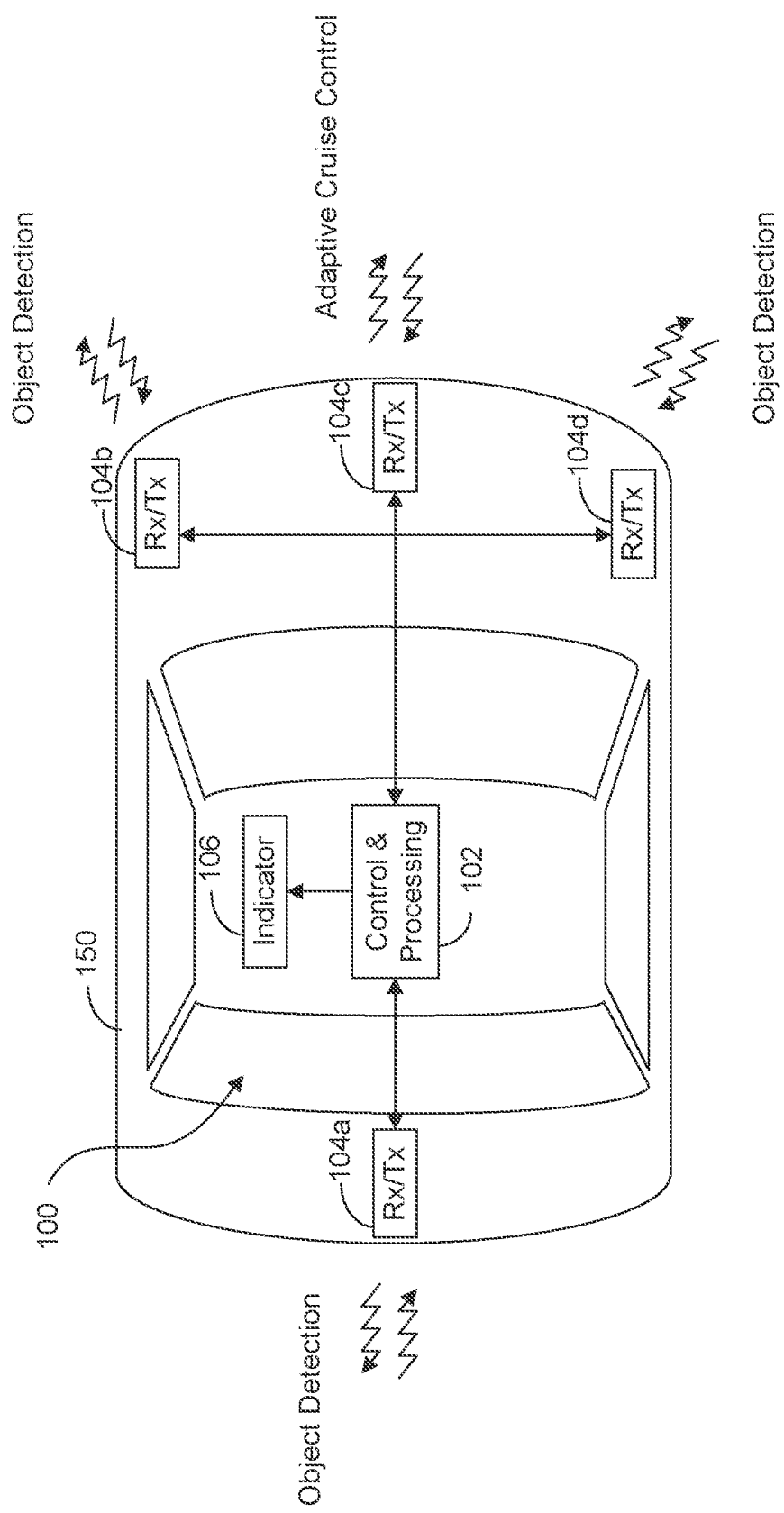
FIG. 1 is a plan view of an automobile equipped with a radar system in accordance with the present invention.

As illustrated in FIG. 1, there may be multiple radars (e.g., 104a-104d) embedded into an automobile. Each of these could employ the ideas contained in the present invention. FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

A radar system operates by transmitting a signal and then listening for the reflection of that signal from objects in the environment. By comparing the transmitted signal and the received signal, estimates of the range to different objects, the velocity of different objects and the angle (azimuth and/or elevation) can be estimated.

There are several different types of signals that transmitters in radar systems employ. A radar system may transmit a continuous signal or a pulsed signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving. One type of continuous wave radar signal is known as frequency modulated continuous wave (FMCW) radar signal. In FMCW the transmitted signal is a sinusoidal signal with varying frequency. By measuring the time difference between when a certain frequency was transmitted and when the received signal contained that frequency the range to an object can be determined.

A second type of continuous wave signal used in radar systems is a phase modulated continuous wave (PMCW) signal. In this type of radar system, the transmitted signal is a sinusoidal signal in which the phase of the sinusoidal signal varies. Typically, the phase during a given time period (called a chip period or chip duration) is one of a finite number of possible phases. A spreading code consisting of sequence of chips, (e.g., +1, +1, −1, +1, −1, . . . ) that is mapped (e.g., +1→0, −1→π) into a sequence of phases (e.g., 0, 0, π, 0, π, . . . ) that is used to modulate a carrier to generate the radio frequency (RF) signal. The spreading code could be a periodic sequence or could be a pseudo-random sequence with a very large period so it appears to be a nearly random sequence. The spreading code could be a binary code (e.g., +1 or −1). The resulting signal has a bandwidth that is proportional to the rate at which the phases change, called the chip rate, which is the inverse of the chip duration. By comparing the return signal to the transmitted signal the receiver can determine the range and the velocity of reflected objects.

Figure 2A:
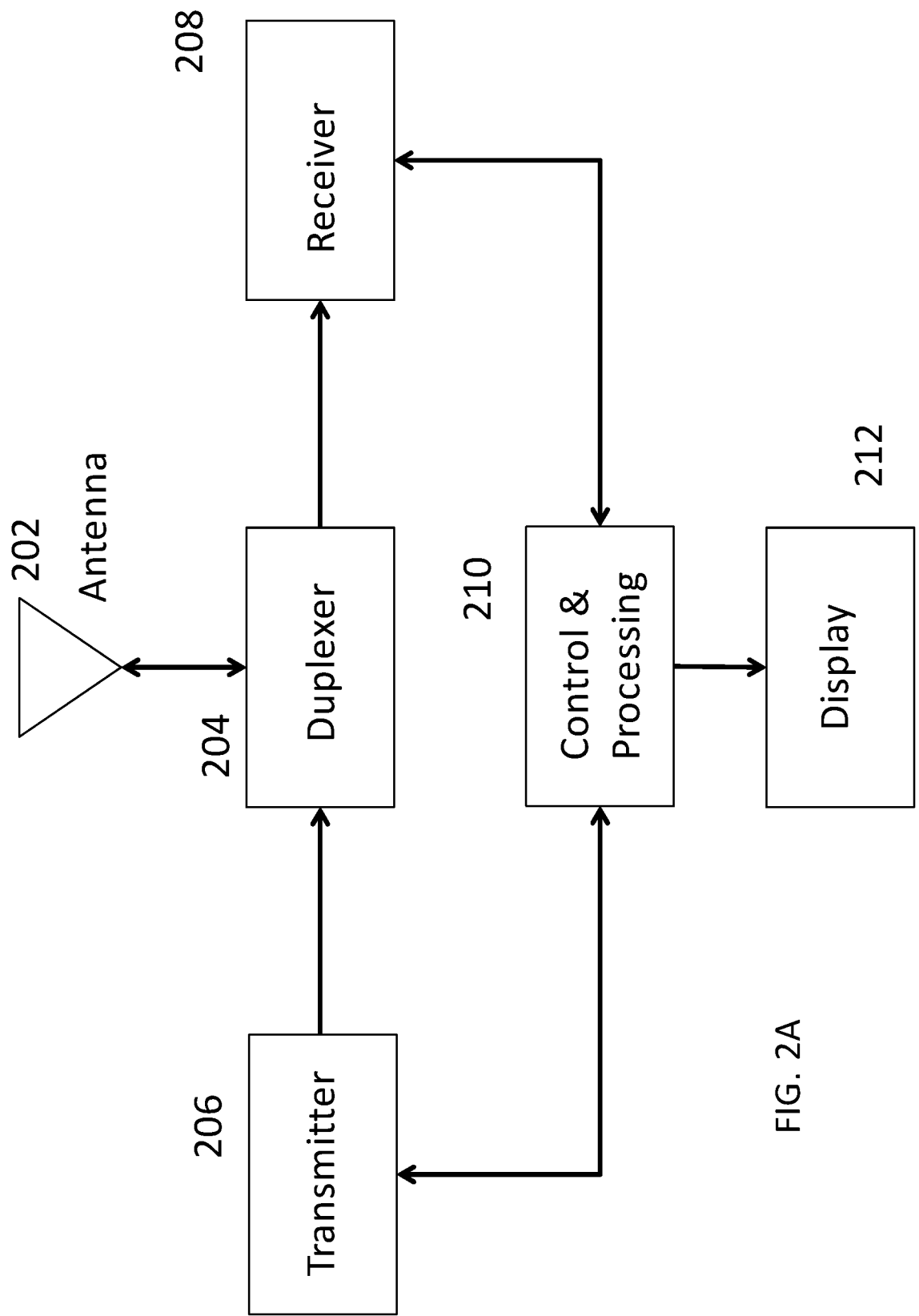
FIGS. 2A and 2B are block diagrams of single transmitter and receiver in a radar system.
Figure 2B:
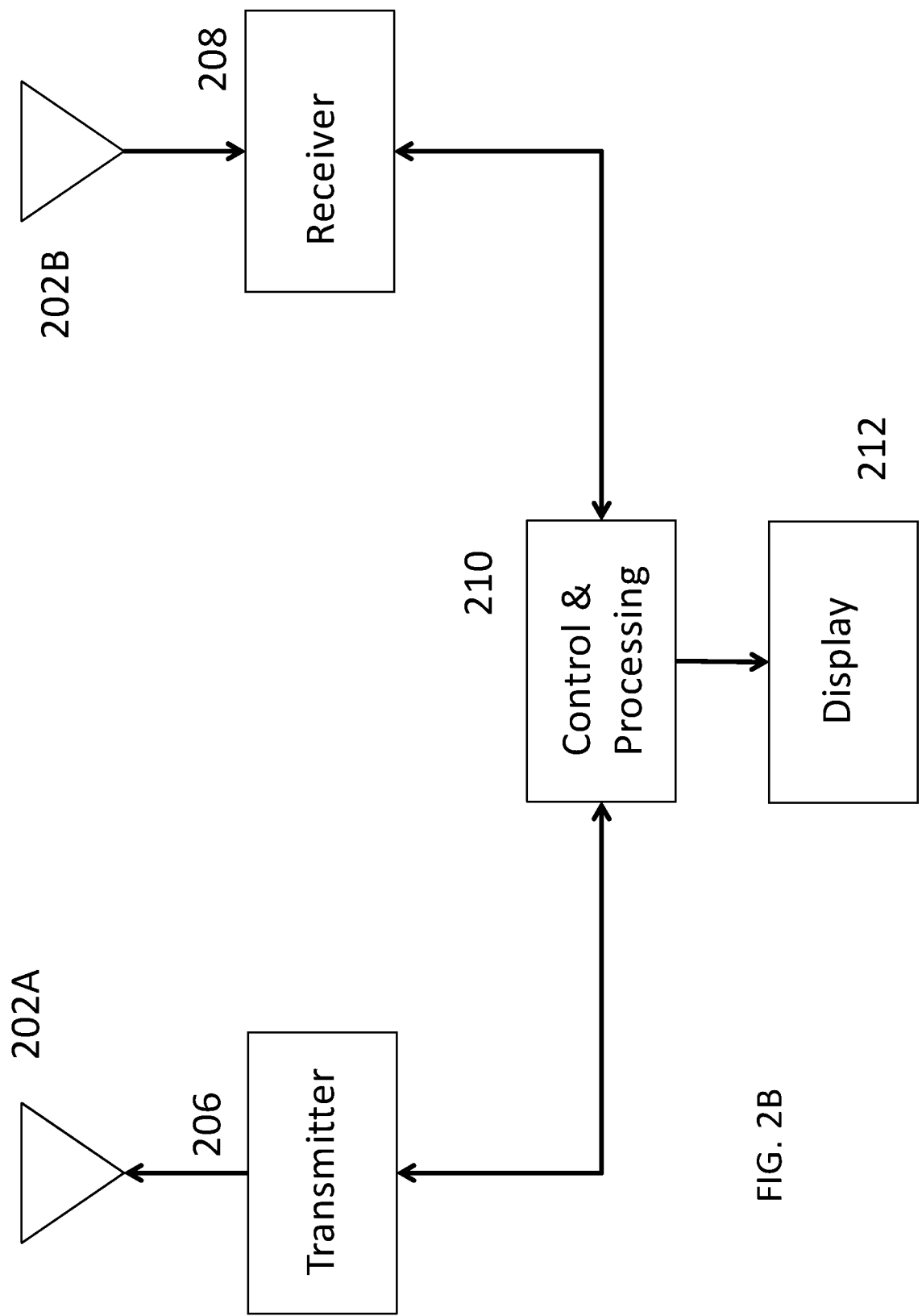

There are several ways to implement a radar system. One way, shown in FIG. 2A uses a single antenna 202 for transmitting and receiving. The antenna is connected to a duplexer 204 that routes the appropriate signal from the antenna to the receiver (208) or routes the signal from the transmitter 206 to the antenna 202. A control processor 210 controls the operation of the transmitter and receiver and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display to visualize the location of objects in the environment.

Figure 3:
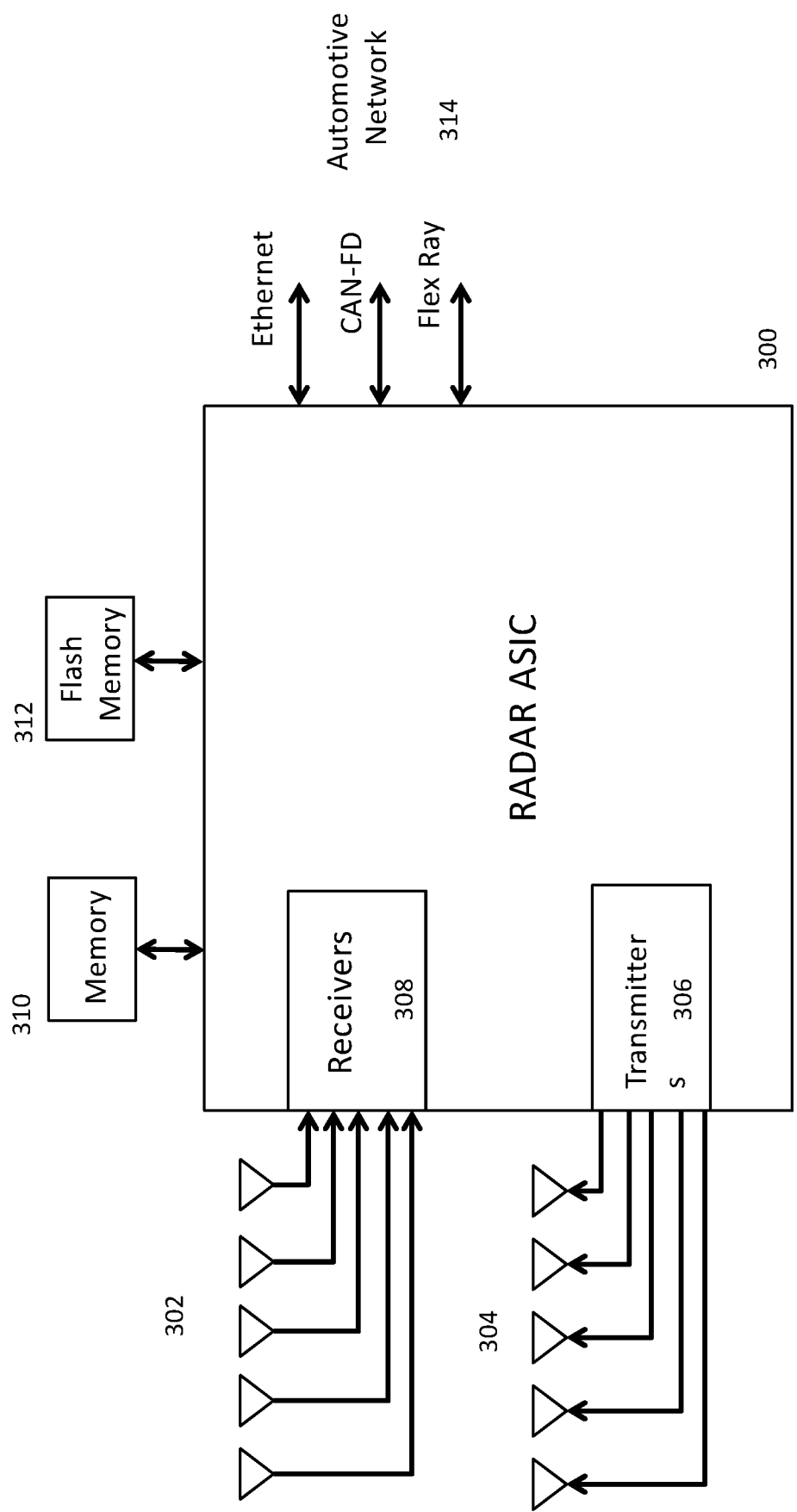
FIG. 3 is a block diagram of multiple transmitters and multiple receivers in a radar system.

A radar system with multiple antennas, transmitters and receivers is shown in FIG. 3. Using multiple antennas allows a radar system to determine the angle (azimuth or elevation or both) of targets in the environment. Depending on the geometry of the antenna system different angles (e.g., azimuth or elevation) can be determined.

The radar system may be connected to a network via an Ethernet connection or other types of network connections 314. The radar system will have memory (310, 312) to store software used for processing the signals in order to determine range, velocity and location of objects. Memory can also be used to store information about targets in the environment.

Figure 4:
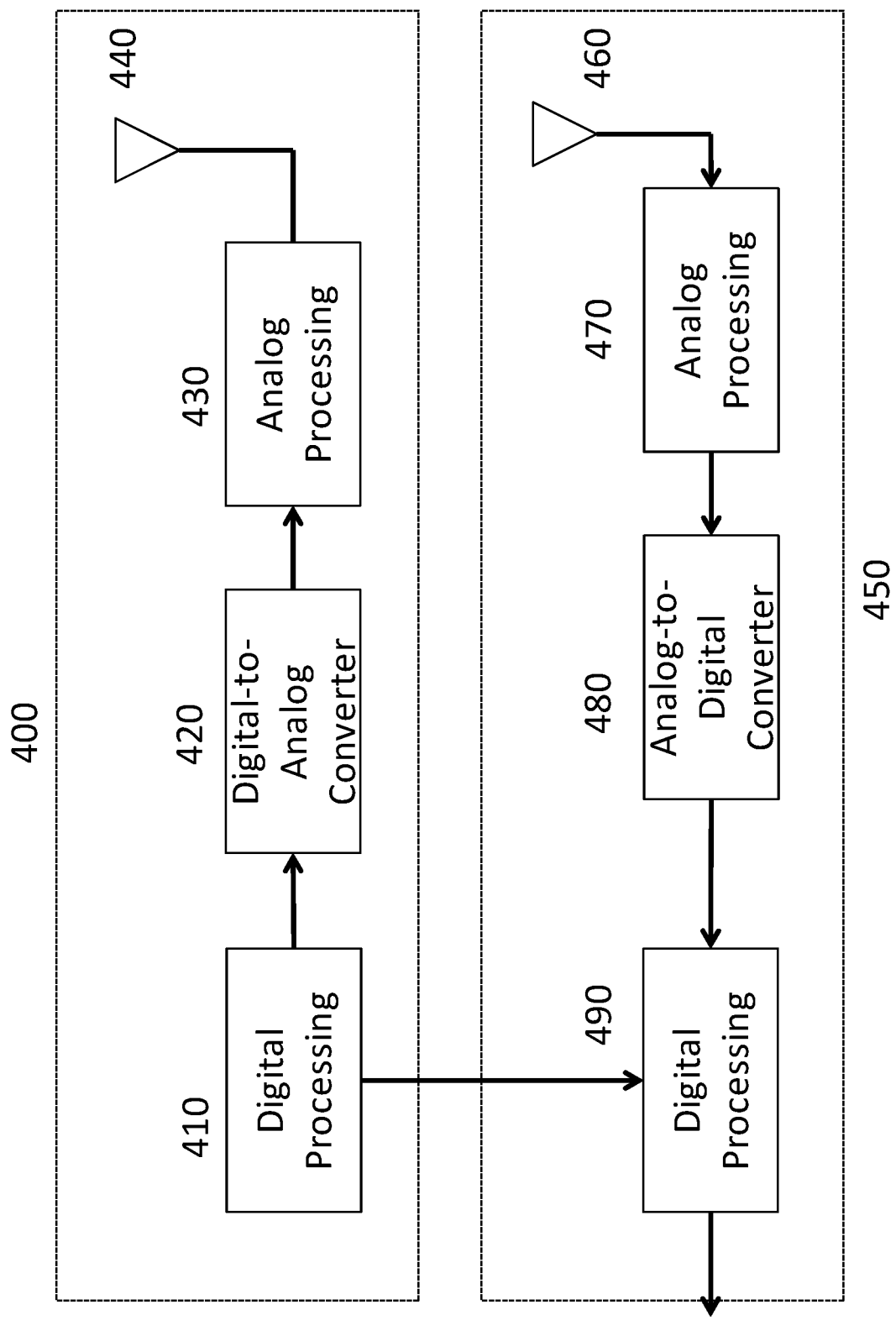
FIG. 4 is a block of a single receiver and single transmitter.

A basic block diagram of a PMCW system with a single transmitter and receiver is shown in FIG. 4. The transmitter 400, as shown in FIG. 4, consists of a digital signal generator 410, followed by a digital-to-analog converter (DAC) 420. The output of the DAC followed is up converted to a RF signal and amplified by the analog processing 430 unit. The result is then used as the antenna 440 input. The digital signal generator generates a baseband signal. The receiver, as shown in FIG. 4, consists of a receiving antenna 460, an analog processing unit that down amplifies the signal and mixes the signal to baseband 470. This is followed by an analog-to-digital converter (ADC) 480 and then digital baseband processing 490. There is also a control processor (not shown) that controls the operation of the transmitter and receiver. The baseband processing will process the received signal and may generate data that can be used to determine range, velocity and angle.

Radars must operate in various environments. For example, an automotive radar must operate in urban areas, suburban areas, rural areas, rain, snow, deserts, parking lots, garages, construction zones, to name a few. Depending on the installation location of the radar in an automobile, the transmitted signal might be reflected off of parts of the automobile. For example, reflections from a bumper in the automobile might create very strong self-interference. The set of environments an automobile is expected to operate in is extensive. Depending on the environment different types of signals might be used. A radar signal appropriate for one environment will not be the best signal to use in a different environment. The receiver processing used will also depend on the environment. The environment might be determined from the radar itself but also could be obtained by the radar from external sources (e.g., other vehicles, cellular networks, GPS).

In addition to operating in multiple environments, radar systems may have different performance objectives. Range resolution, maximum unambiguous range, Doppler resolution, angular resolution, and field of view are some of the objectives of a radar system. The smallest separation of two objects, such that they are recognized as two distinct objects by a radar, is known as the range resolution of the radar. The range resolution is inversely proportional to the bandwidth of the transmitted signal. A short-range radar (SRR) might provide a range resolution that is sub-meter (e.g., less than 5 cm) but only for distances from 0 to less than 30 meters. A long-range radar might have a much larger range resolution. Another performance measure is the maximum unambiguous range, $D_u$. This is the maximum distance of an object such that the distance can be correctly (unambiguously) determined from the received (reflected) signal. If the delay of the reflected signal can be confused with another (shorter) delay due to the period of the transmitted signal, then the distance to the object cannot be unambiguously determined. A long-range radar (LRR) might have a maximum unambiguous range out to several hundred meters whereas a SRR might have an unambiguous range out to several tens of meters.

Doppler resolution refers to the capability of a radar to discriminate the velocity of different targets. There is a maximum Doppler shift that a radar can determine without ambiguity. This is known as the maximum unambiguous velocity. A radar system using multiple antennas can determine the angle of a target relative to some reference in either the horizontal plane (azimuth) or the elevation angle (angle relative to the horizontal plane). A set of angles for which a radar can detect an object is called the field of view. Generally, with a fixed number of antennas, a large field of view would result is less angular resolution while a narrow field of view can provide better angular resolution. With certain antenna configurations, the elevation angle of an object can be determined.

The description herein includes a radar system in which there are $N_T$ transmitters and NR receivers $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment. Each of the receivers is receiving the sum of reflected signals due to all three of the transmissions at the same time. Each receiver can attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

As mentioned earlier, there are various types of signals used in radar systems. A pulsed radar transmits a signal for a short duration of time then turns off the transmitter and listens for reflections. A continuous wave radar transmits a continuous signal. One type of continuous wave radar signal is known as frequency modulated continuous wave (FMCW) signal. The frequency of this signal is varied from some low frequency value to a high frequency value over some time interval and then repeats. Another type of continuous wave radar signal is known as phase modulated continuous wave (PMCW). The phase of the transmitted signal is varied in PMCW. Often the variation of the phase is according to a spreading code. The spreading code may be binary (e.g., +1 and −1) in which case the phase of the transmitted signal at any time takes on one of two possible values (e.g., 0 and π radians). Spreading codes with more than two levels can also be used. Often the code repeats after a certain duration in time duration, sometimes called the pulse repetition interval (PRI). Various types of spreading codes can be used. These include pseudorandom binary sequence (PRBS) codes also called m-sequences, almost perfect autocorrelation sequences (APAS), Golay codes, constant amplitude zero autocorrelation codes (CAZAC) also known as Frank-Zadoff-Chu (FZC) sequences, as well as many other codes that can be used. In a radar system with a single antenna, a single spreading code is used. The autocorrelation of this single code determines the capability of the radar to estimate the range (range resolution and maximum unambiguous range). Codes with good autocorrelation properties include Barker sequences, m-sequences, FZC sequences, and Golay codes. These codes have small sidelobes (the off-center autocorrelation). Codes that have ideal autocorrelation (e.g., Golay codes, CAZAC) can have range sidelobes in the presence of non-zero Doppler shift that will limit the detectability of far targets in the presence of near targets.

In a multiple-input, multiple-output (MIMO) system, there are multiple transmitters that operate simultaneously. Each transmitter uses a spreading code and thus multiple codes are needed, one for each transmitter. In this case (multiple transmitters), codes that have good autocorrelation, as well as good cross correlation properties are desirable. Generally, the better the autocorrelation of codes, the worse the cross correlation properties.

Figure 5:
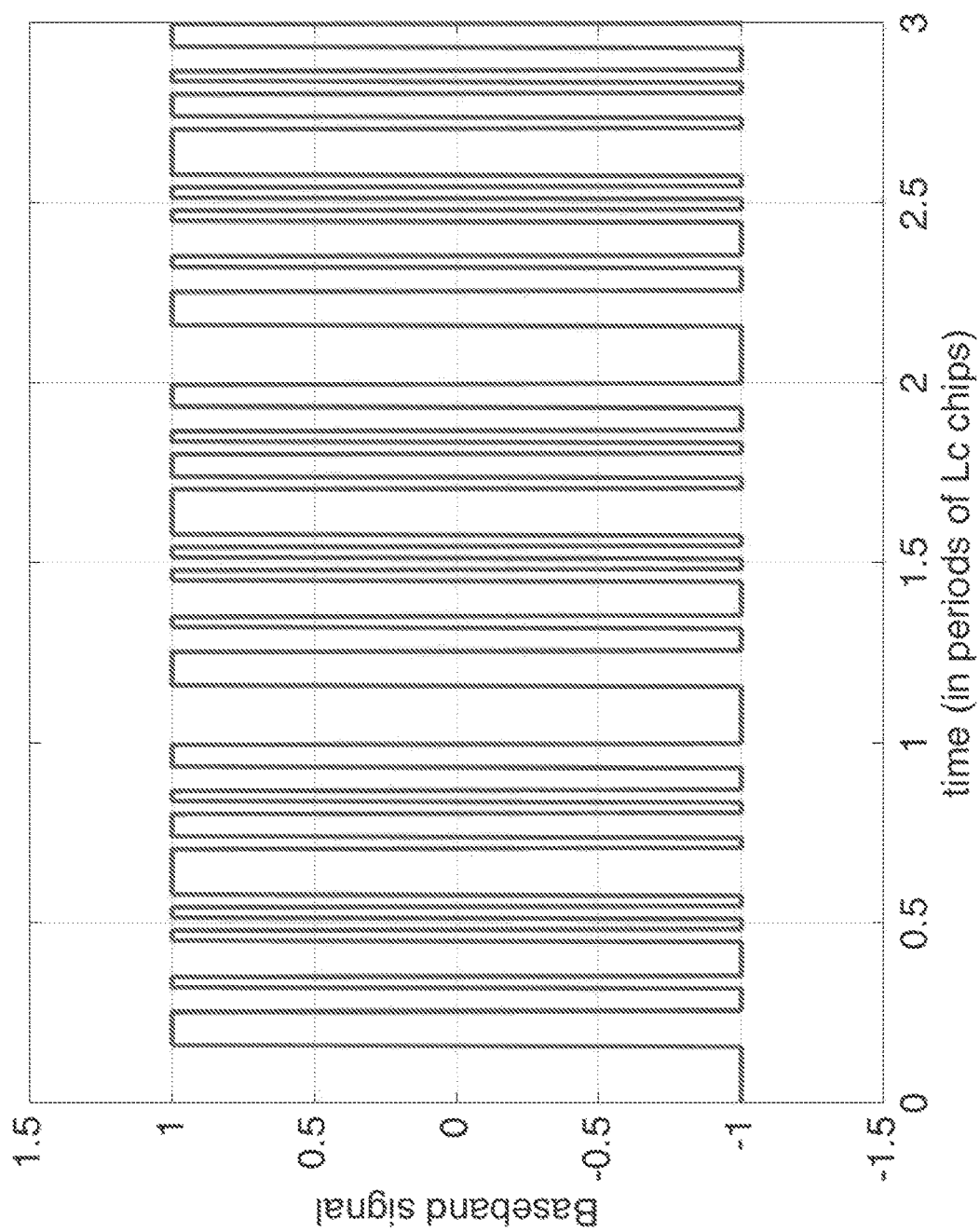
FIG. 5 is a graph illustrating an exemplary transmitted signal using an m-sequence of length 31 in accordance with the present invention.

FIG. 5 shows a baseband signal which has a period of $L_C=31$. The chips in this example are from a maximal length sequence (m-sequence) of length $L_C=31$ generated by an exemplary shift register of length 5. Note that the signal repeats every $L_C$ chips or $L_C T_C$ seconds. The pulse repetition rate is $R_{PR}=1/(L_C T_C)$. The transmitted signal is generated from the baseband signal by modulating the baseband signal onto a carrier frequency to generate a radio frequency signal.

As illustrated in FIG. 4, the received signal is down-converted to a complex baseband signal via an RF front end analog signal processing 470. The analog signal processing involves amplification, mixing with a local oscillator signal, and filtering. The mixing is with two sinusoidal signals that are 90 degrees out of phase (e.g., cosine and sine or in-phase and quadrature-phase signals). After down conversion, the complex analog baseband signal is converted to a complex baseband digital signal by using analog-to-digital converters (ADCs) 480. The complex baseband digital signal (output by the ADCs 480) is then the input to a digital processing unit 490. The digital processing unit 490 performs correlations or matched filtering. The correlators multiply the received complex baseband signal by a delayed replica of the baseband transmitted signal and then the result is accumulated over a certain time interval. A bank of correlators where each correlator has a different delay used for the replica of the baseband transmitted signal will produce a set of correlations that correspond to different ranges of objects. In essence, a correlator that has a particular delay of the baseband transmitted signal is looking for the presence of a reflection from an object at a distance corresponding to the particular delay for the particular correlator, and for which the round-trip delay is the delay used for the baseband transmitted signal.

A matched filter is a device that produces all correlations for all possible delays. That is, the output of the matched filter at a given time corresponds to a correlation with a given delay applied to the transmitted signal when doing the correlation. The matched filter provides all possible correlations. Note that the matched filter should produce a complex output because the input is complex. Alternatively, there could be a filter for the real part of the input and a filter for the imaginary part of the input. A matched filter can also be implemented by a fast Fourier transform (FFT) of the received complex baseband signal and the corresponding transmitted signal, multiplying the results, and then taking an inverse fast Fourier transform (IFFT).

FIG. 5 illustrates a baseband signal which has a period of $L_C=31$. The chips in this example are from a maximal length sequence (m-sequence) of length $L_{C=31}$ generated by an exemplary shift register of length 5. Note that the signal repeats every $L_C$ chips or $L_C T_C$ seconds. The pulse repetition rate is $R_{PR}=1/(L_C T_C)$. The transmitted signal is generated from the baseband signal by modulating the baseband signal onto a carrier frequency to generate a radio frequency signal.

Figure 6:
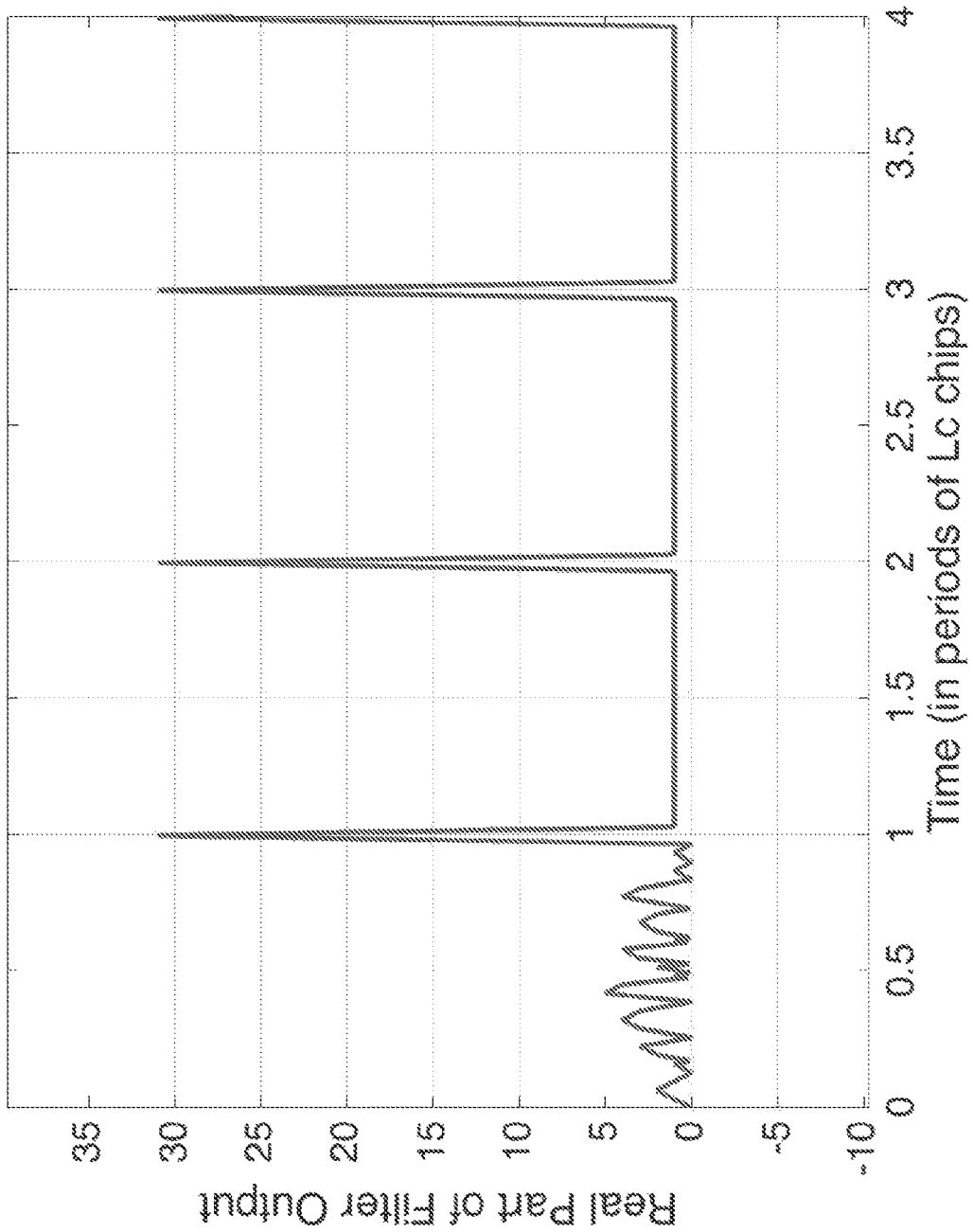
FIGS. 6-9 are graphs illustrating exemplary matched filter outputs over time in accordance with the present invention.

FIG. 6 shows the real part of the output of a matched filter due to the transmitted baseband signal shown in FIG. 5. Here it is assumed the radar started to transmit at time 0 and there is no delay between the transmitter and receiver. That is, there is an object at distance 0. The matched filter output before a full period of the signal is transmitted generates partial correlations. That is, it correlates with only a portion of the code because only a portion of the code has been transmitted. Only after the entire period of the code has been transmitted does the correlation reach a peak. In continuous operation, an object that has a delay of one period of the spreading code will appear to have the same delay as an object at distance 0. Thus, a radar using this system cannot determine whether the delay is 0, one period of the spreading code, two periods of the spreading code, and so on. Therefore, the maximum unambiguous range in this case corresponds to at most one period of the spreading code. A longer spreading code will yield a larger maximum unambiguous range. A delay of τ corresponds to a range of τc/2 where c is the speed of light. The factor of two is because the delay corresponds to the round-trip time from the radar to the target and back to the radar. Here the assumption is that the transmitter and receiver are approximately co-located.

Figure 7:
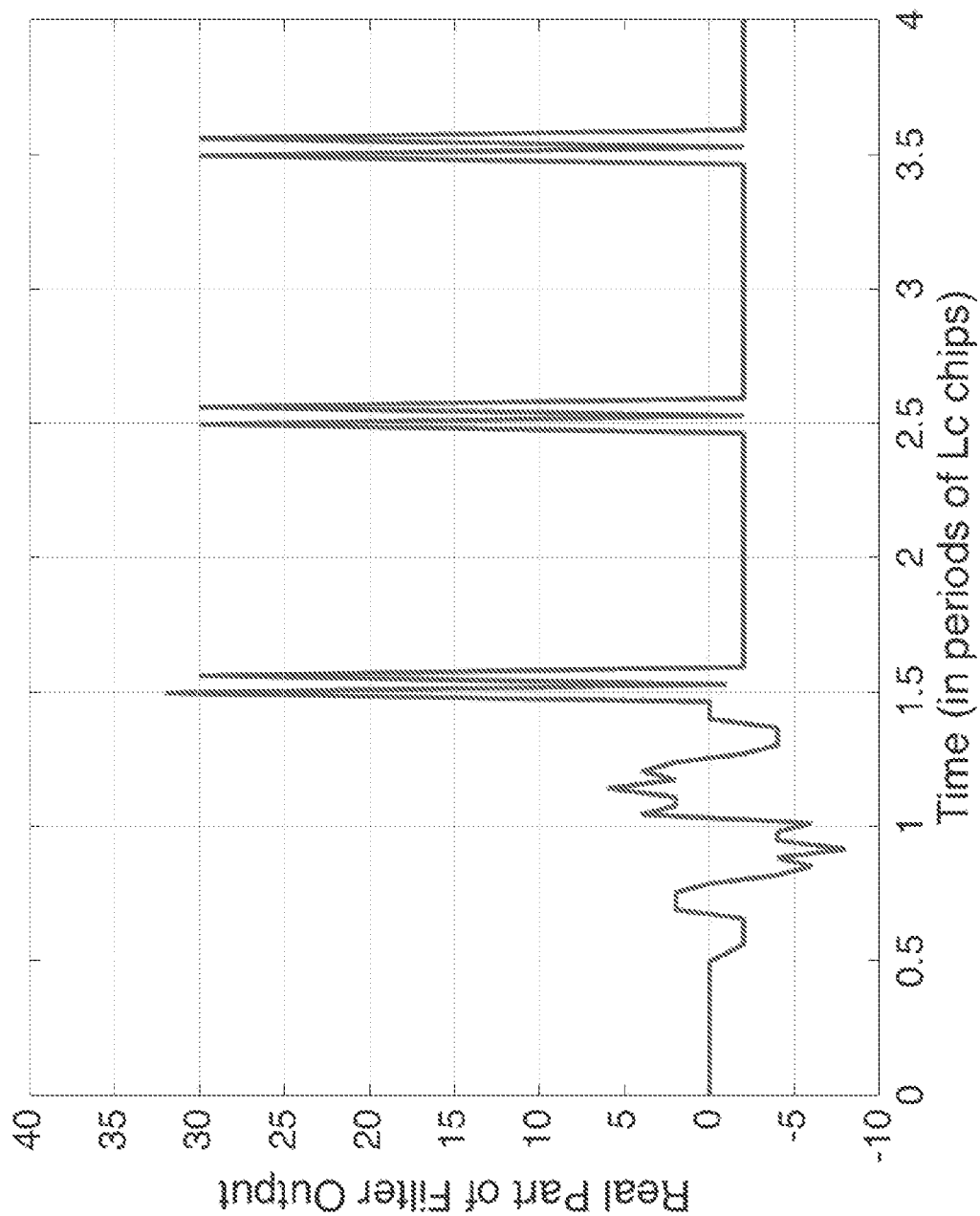

FIG. 7 illustrates the real part of the output of the matched filter when there are two objects that have a differential range delay of 2 chip durations. The filter output shows two distinct peaks in the output of the matched filter.

For PMCW radar systems that utilize nonideal spreading codes and correlate over a certain time interval, the autocorrelation is not ideal. That is, the sidelobes are not zero. The sidelobes of a near target can mask the peak of the correlation for a far object or target because the signal from the near object or target is far stronger than the signal from the far object or target.

Range Estimation

Figure 8:
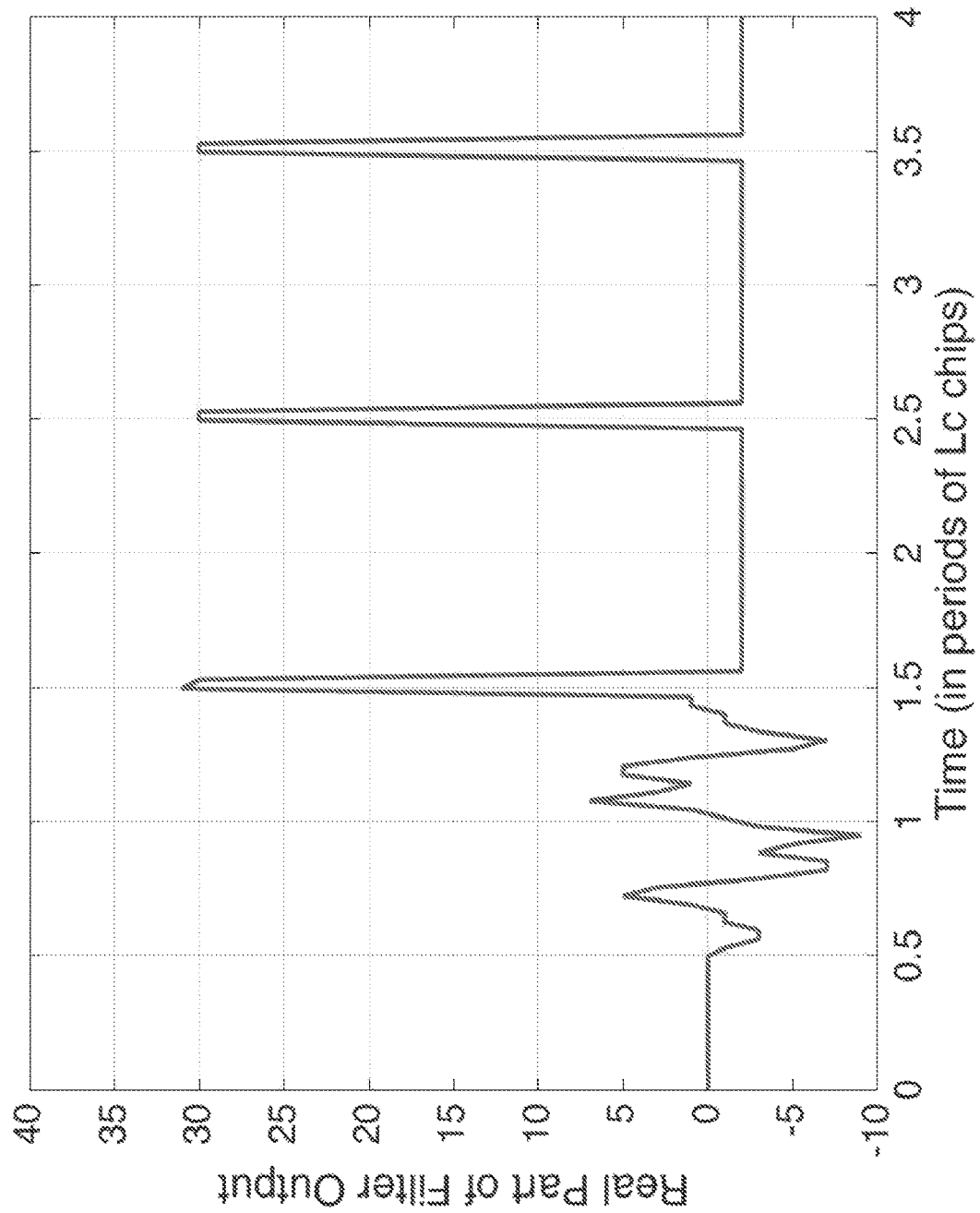

FIG. 8 illustrates the case where the differential round trip delay between two targets is one chip duration. In this case, two objects cannot be distinguished and thus the range resolution of this would correspond to the differential distance corresponding to a duration of half (½) a chip. If Tc denotes the chip duration and Lc denotes the number of chips in one period of the transmitted sequence, then the rate at which the sequence is repeated is Rpr=1/(LcTc), which is sometimes referred to as the pulse repetition rate even though this is a continuous type of signal. If c denotes the speed of light, then the range resolution is given by:

$$D_R=(T_C/2)c=c/(2R_{PR}L_C).$$

If a signal repeats every $T_{PR}$ or at rate $R_{PR}$, then the maximum unambiguous range $D_U$ is:

$$D_U=cT_{PR}/2=(c\ T_C L_C)/2=c/(2R_{PR}).$$

Two targets separated by the maximum unambiguous range will appear to the radar systems as being at the same range. This is sometimes called range aliasing. If the chip duration, $T_C$, is decreased, then the range resolutions would improve proportionally. However, changing the chip duration changes the bandwidth, which might be limited by regulations. If there are 31 chips per period of the spreading code, there are at most 31 different ranges that can be distinguished. As an example, if $T_C=10$ nanoseconds (a chip rate of 100 Mchips/second), then the range resolution would be limited to 1.5 meters. That is, two objects separated by less than 1.5 m would cause reflected signals to be less than a chip duration apart in delay. For this example, the maximum unambiguous range would be 46.5 m. That is, an object at a distance of 46.5 m would cause a reflected signal to have a delay exactly equal to the period of the signal and thus would appear as an object at a distance of 0 m. A longer spreading code would provide for a larger unambiguous range. For example, a spreading code of length 1023 would provide a maximum unambiguous range of about 1,534 m.

Velocity Estimation

Another goal of an exemplary radar system is to estimate the differential velocity between the radar system and a target. Because targets in the environment, or the radar itself, are moving, the signal reflected from an object will not have the same frequency as the transmitted signal. This effect is known as the Doppler Effect and can be used to determine the relative velocity of targets in the environment. Suppose the differential (radial) velocity of the target relative to the radar system is Δv and the carrier frequency is $f_C$. Then, the Doppler frequency shift is $f_D=2\Delta V\ f_C/c$. This is because there is a Doppler shift of $\Delta V f_C/c$ between the radar transmitter and the target and then an additional $\Delta V f_C/c$ Doppler shift of the reflected signal from the target to the radar receiver. For example, a carrier frequency of 79 GHz with a differential velocity of 300 km/hour=83.3 m/s would result in a frequency shift of about 44 kHz. A frequency shift of $f_D$ corresponds to a differential velocity of $\Delta V=(f_D)c/(2\ f_C)$.

Figure 9:
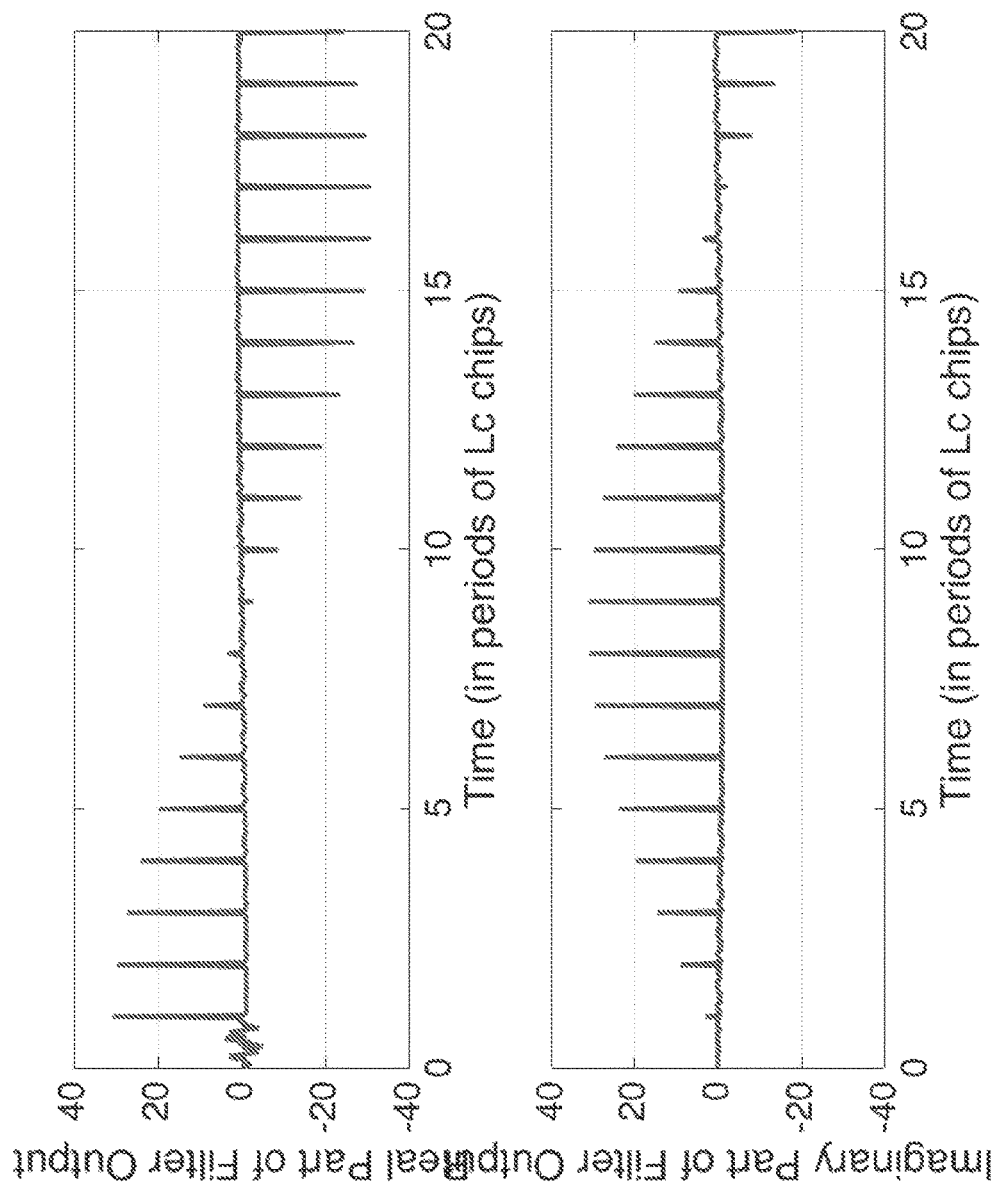
Figure 10:
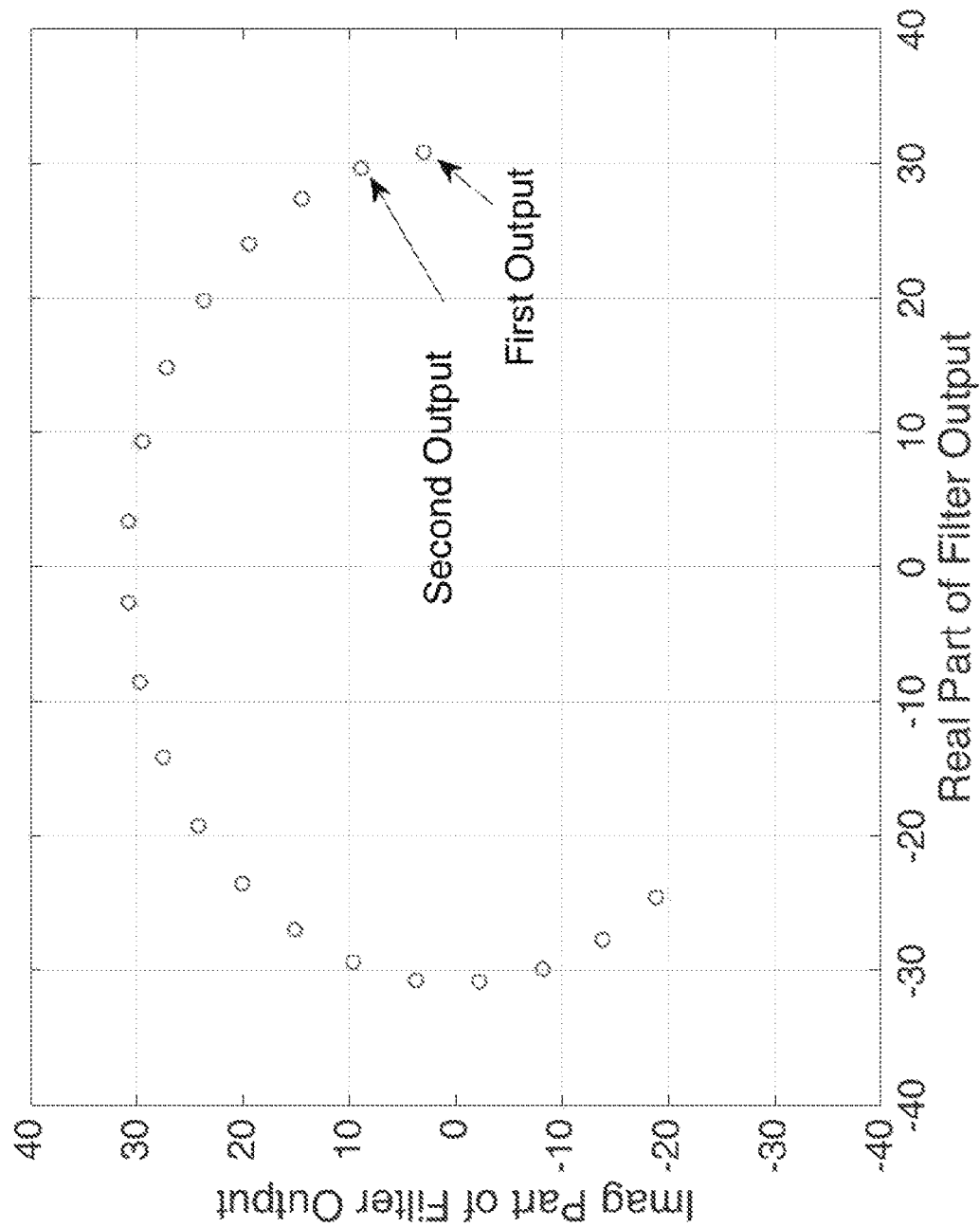
FIG. 10 is a graph illustrating an exemplary imagery part of filter output vs a real part of filter output in accordance with the present invention.

Suppose that a signal, for example an m-sequence, is repeated N times. This is called a scan. The period of the signal is $L_C T_C$. The time duration of the scan is $N*L_C T_C$. During each repetition, a correlation with a spreading code with a given delay (e.g., corresponding to the delay with a given target) is calculated. This correlation calculation generates a complex number for a given delay and this repeats N times during a scan. The N complex numbers can be used to determine the Doppler frequency shift at the given delay. In the absence of Doppler frequency shift the complex correlation values will be constant. In the presence of a Doppler shift the complex correlation values will rotate. The rate of rotation will be related to the Doppler frequency. FIG. 9 illustrates the real and imaginary parts of the matched filter output when there is a Doppler shift. FIG. 10 illustrates the complex values at the peak correlation outputs. As can be seen, the matched filter output is rotating around a circle. The rate of rotation is a measure of the Doppler frequency. Knowing the Doppler frequency allows a calculation of the relative velocity of a target.

One way to estimate the Doppler frequency is to use a fast Fourier transform (FFT) on the complex samples. With this approach to estimating the frequency shift due to Doppler, with N points as the input to the FFT, there will also be N frequency points generated. The frequency resolution possible is over the range of frequencies from a negative frequency of $-R_{PR}/2$ to a positive frequency $+R_{PR}/2$ or a range of $R_{PR}$. Thus, the spacing between frequency points will be $f_R = R_{PR}/N$. This is the frequency resolution. This corresponds to a velocity resolution of:

$$V_r = c\, R_{pr}/(2 f_c N).$$

If the complex correlation samples are produced at a rate of $R_{PR} = 1/T_{PR} = 1/L_C T_C$, then the frequency range that those points represent is limited to $-R_{PR}/2$ to $+R_{PR}/2$. Thus, the maximum unambiguous differential frequencies $f_u$ that can be represented is given by $-R_{prf}/2 < f_u < +R_{prf}/2$. When this is converted to velocity, the result is that the maximum unambiguous velocity is limited to values in the interval shown below:

$$-cR_{PR}/(4 f_C) < V_U < +cR_{PR}/(4 f_C).$$

Increasing the repetition rate increases the maximum unambiguous velocities that can be determined. However, increasing the repetition rate decreases the maximum unambiguous range that can be determined. The product of the maximum unambiguous velocity and maximum unambiguous range is limited as $$-c^2/(8 f_c) < D_u V_u < c^2/(8 f_c)$$

which is independent of the various parameters of the transmitted signal, except the carrier frequency.

The product of the velocity resolution and the range resolution is given as $$D_r V_r = c^2/(4 F_C L_C N)$$

where $L_C$ is the number of chips in a single period of the spreading code and N is the number of points in the FFT used to determine the velocity. For a fixed scan time ($L_C N T_C$) and fixed chip duration $T_C$, there is a tradeoff between the resolution possible for the range and the resolution possible for the velocity. By increasing N and decreasing $L_C$, the velocity resolution improves at the expense of range resolution. Similarly, decreasing N and increasing $L_C$ will improve the range resolution at the expense of velocity resolution.

In some systems the signal has $L_C$ chips per period but this sequence is repeated M times and the correlation values are accumulated to generate a signal complex sample for a given range. The sequence of such samples is then used for Doppler processing.

The above illustrates a tradeoff between the maximum unambiguous range and the maximum unambiguous velocity that only depends on the carrier frequency. An increased product of unambiguous velocity and range can only be obtained if the carrier frequency is decreased. In some circumstances, it might be desirable to obtain a larger unambiguous range at the expense of a smaller unambiguous velocity (or vice versa). Thus, a system that can adjust the repetition frequency of the signal would be able to adjust to different objectives. There is also a tradeoff between range resolution and velocity resolution for a given bandwidth and scan duration. In some situations, it would be advantageous to have better range resolution while in other cases it would be beneficial to have better velocity (or Doppler) resolution. Thus, it would be of benefit to be able to adjust the system parameters depending on the objective function of interest to obtain either the best range resolution or the best velocity resolution (with a given fixed time interval for the scan).

As an example, consider a radar system with a desired scan duration (time to produce a velocity estimate) of 0.1 ms (100 scans per second). Suppose the chip rate is fixed at $10^{-8}$ seconds and the carrier frequency is 79 GHz. A spreading code period of 100 chips would allow 1000 repetitions in the scan time. This corresponds to an unambiguous range of 150 m and an unambiguous velocity estimate range of (−950 m/s, +950 m/s). On the other hand, a spreading code period of 1,000 would allow only 100 repetitions of the code in the same time. The unambiguous range would increase to 1,500 m, while the unambiguous velocity would decrease to (−95 m/s, +95 m/s).

At the receiver it is necessary to store the complex outputs of the correlators for different possible ranges and for different receivers. A sequence of N complex samples needs to be stored for a particular range and a particular virtual receiver (a receiver matched to a particular spreading code of a transmitter) in order to determine an estimate of the velocity for an object at a particular range. For example, suppose that there are 512 range bins desired to locate potential targets and the number of repetitions of the code is 1024. This would require storing 512×1024 complex numbers with each complex number requiring 4 bytes of storage. This would require more than 2 million bytes of storage per virtual receiver. If there are 4 transmitting antennas and 16 receiving antennas then this would require about 134 Mbytes of storage, much more than is practical with current storage limits integrated onto a chip. On the other hand, storing this off chip would require a significant amount of time to transfer data. At a rate of 1600 Mbytes/second only about 12 transfers could happen per second. The number of virtual receivers determines the possible angle resolution. More receivers can provide more angular resolution at the expense of additional storage or at the expense of worse range or velocity resolution. Thus, the storage restrictions limit either the angular resolution, the range resolution, or the velocity resolution.

In automotive radar systems, there are various objects in the environment that reflect the transmitted signals of the radar. Some of the objects are stationary objects such as road signs, parked cars, light poles and such. There are numerous such objects that are stationary but since the automobile containing the radar is moving, these objects generate reflected signals with Doppler shift relative to the transmitted signal. On the other hand, there are objects such as other vehicles which are not stationary in the environment and have a different Doppler shift than stationary objects. Often, the stationary objects appear as a dense collection of radar returns for different ranges and different angles, whereas nonstationary objects are rather sparse in the environment. These characteristics can be exploited in processing the data obtained from the signals received from objects in the environment.

In addition to the above, interference from other radar systems needs to be accounted for. Interfering radars could be using the same type of signals as the vehicle in which the invention of this patent is installed. It is also possible that the interfering radar system is using a different type of signal (e.g., FMCW vs. PMCW). It would be useful to be able to mitigate in some way the effect of interfering radar systems. Different types of interference will require different mitigation techniques. Mitigation of the effects of interfering systems generally will not be ideal and it is often the case that the mitigation, while reducing the effect of the interference, will also degrade the desired signal in some manner. If no interfering radar system is present, then it would be desirable to not employ the mitigation technique. As such, it would be desirable to have a radar system that can adapt to the environment present.

Figure 11A:
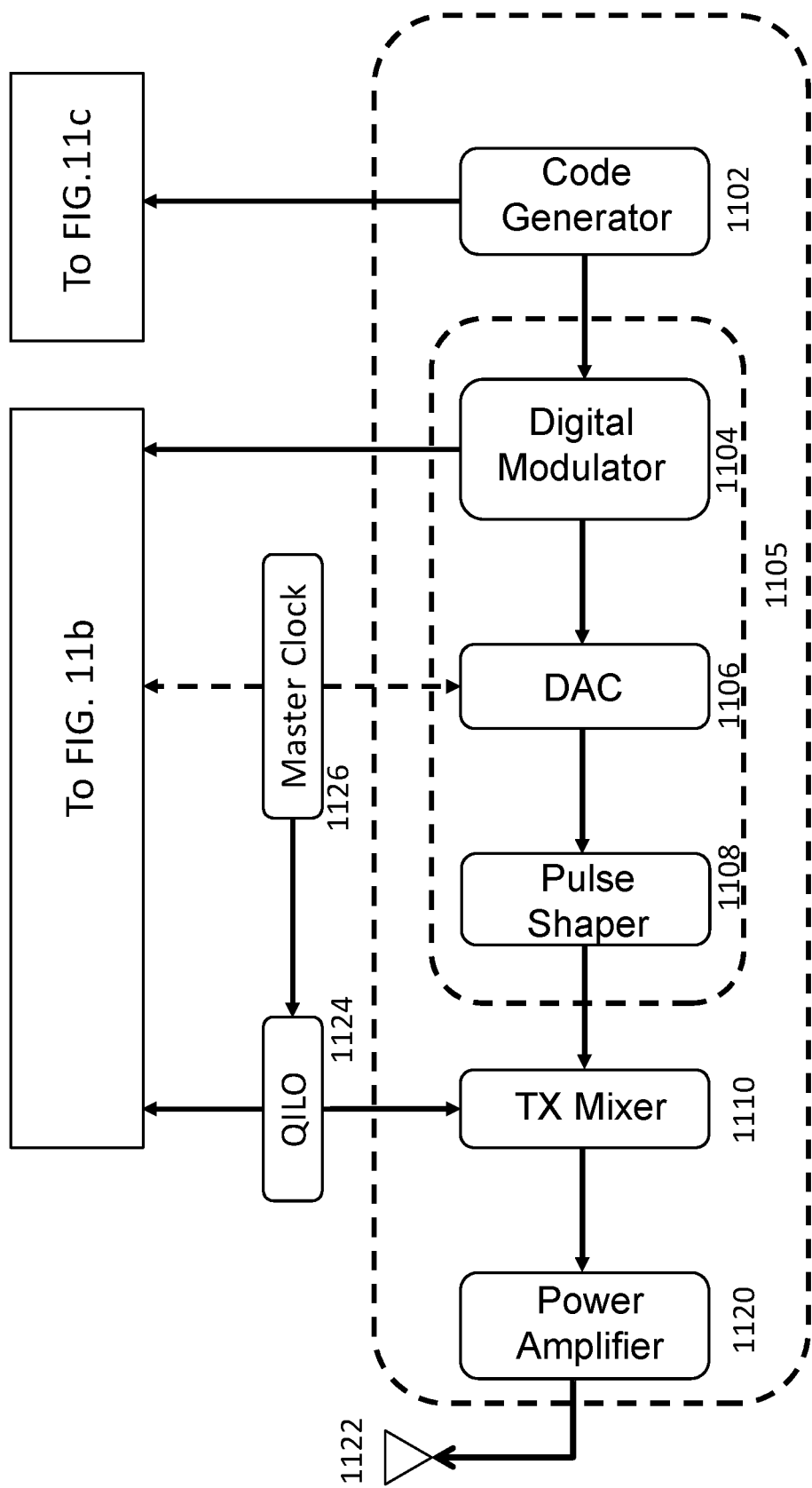
FIGS. 11a, 11b, 11c, and 11d are block diagrams illustrating exemplary steps to signal processing in accordance with the present invention.

In a preferred embodiment, the processing of the signals is shown in FIGS. 11a, 11b, 11c, and 11d. FIG. 11a illustrates exemplary processing modules for a transmitter. A code generator 1102 generates a spreading code. The output of the code generator 1102 is modulated with a digital modulator 1104 to generate a complex baseband signal. The modulation is accomplished in two parts. In the first part the code is mapped to a complex sequence of in-phase and quadrature phase components at the digital modulator 1104. The result is converted to an analog signal by the digital-to-analog converter (DAC) 1106. The output is further shaped with a pulse shaper 1108 to generate a complex baseband analog signal. This signal is up-converted with a TX Mixer 1110. An oscillator 1124 is the other input to the mixer to produce a radio frequency (RF) signal. The oscillator signal is also used at the receiver. This is indicated by the connection of the oscillator to components in FIG. 11b. The result of up-conversion is then amplified by a power amplifier 1120 before transmission by an antenna 1122. A master clock 1126 is used to control the timing of the oscillator and to control the timing of the digital circuitry. The master clock 1126 and the oscillator are also shared with the transmitter circuitry shown in FIGS. 11b and 11c. The output of the digital modulator 1104 is shared with the receiver so that the receiver can apply interference cancellation. The output of the code generator 1102 is shared from the transmitter to receiver so appropriate correlation or matched filtering can be applied at the receiver.

Figure 11B:
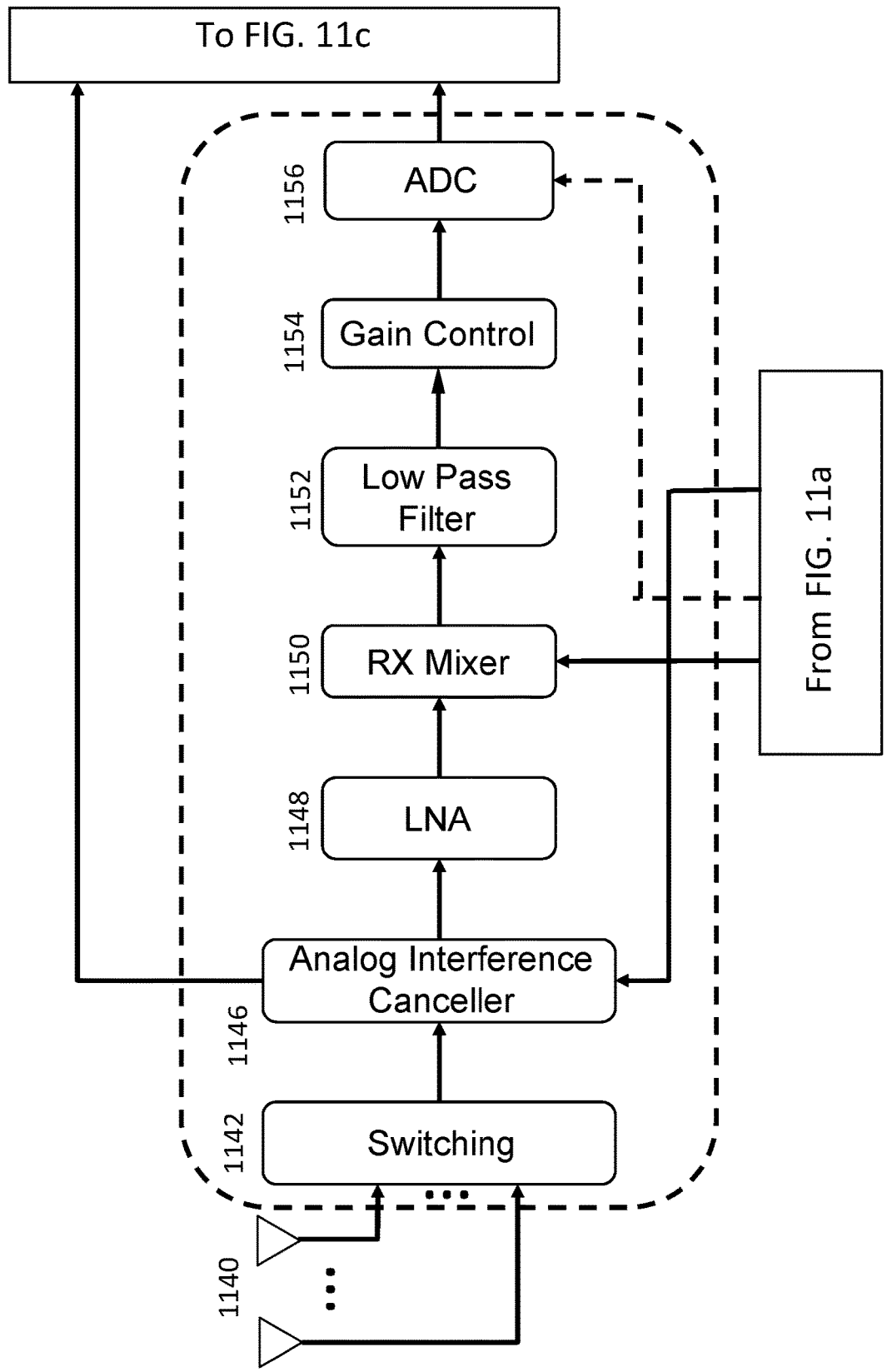

FIG. 11b illustrates exemplary analog processing circuitry of the receiver. Various blocks or modules are illustrated. One or more receiving antennas are connected to a switch 1142 that connects one of the antennas 1140 to a receiver. There can be more than one receiver so that different antennas can be connected to different receivers. Not all the antennas need to be connected to a receiver. Because there can be very strong self-interference from the transmitted signal reflecting off of nearby objects (e.g., a bumper), the analog interference cancellation unit 1146 is employed. A signal from the cancellation unit 1146 can be provided to the digital processing where additional interference cancellation can be done. The output of the analog interference cancellation 1146 is provided to a low noise amplifier 1148. The low noise amplifier output is mixed down to baseband by an RF mixer that also uses the oscillator signal (from FIG. 11a). The resulting low pass complex baseband analog signal is filtered (with low pass filter 1152), and further amplified (with gain control 1154) before being converted to a digital signal by an analog-to-digital converter (ADC) 1156. The result of the ADC 1156 is fed to digital processing circuitry shown in FIG. 11c.

Figure 11C:
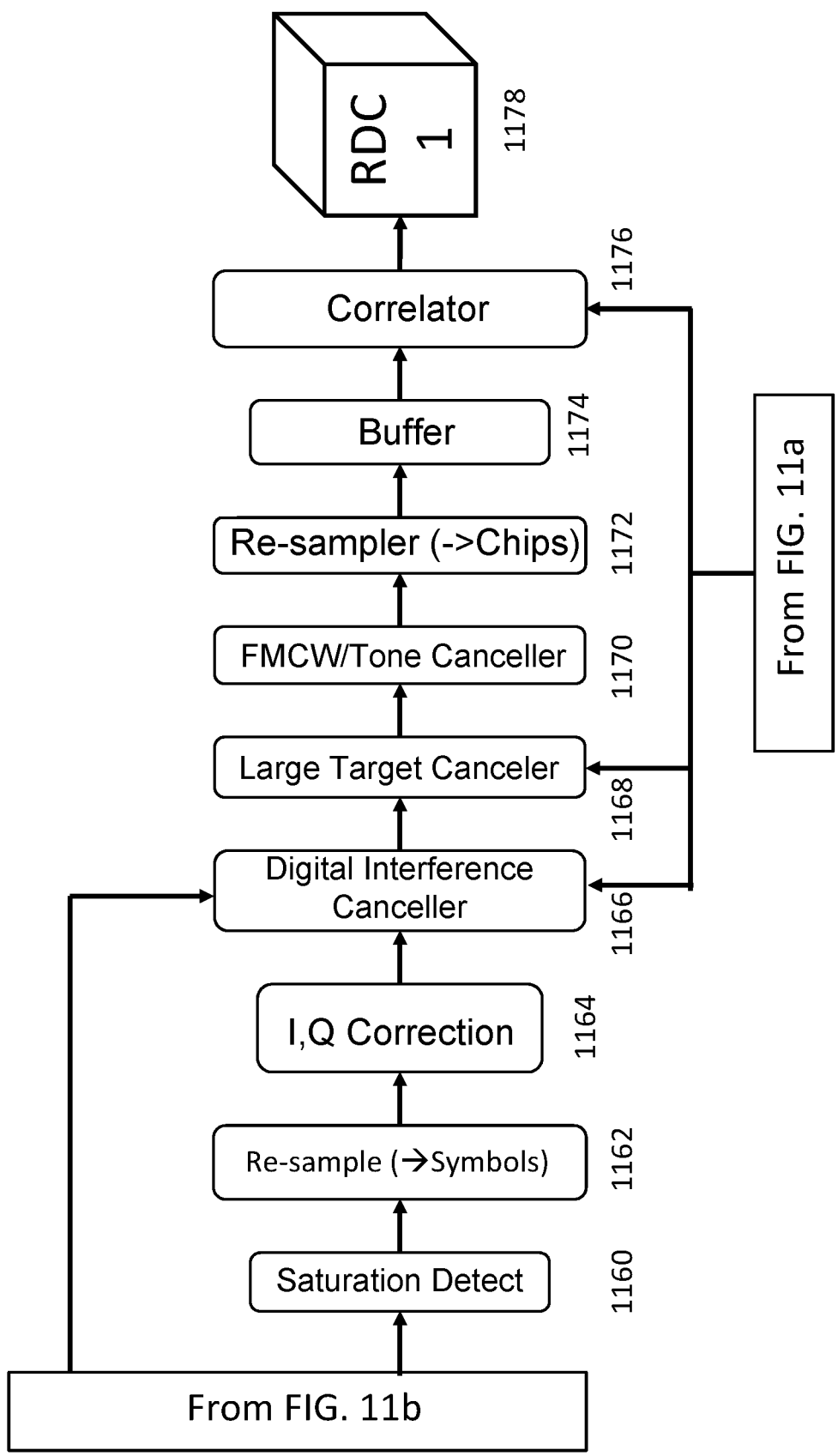

FIG. 11c illustrates exemplary digital processing circuitry of the receiver. Various signal processing blocks or modules are illustrated. First, a saturation detection block 1160 detects whether the ADC input has caused the ADC 1156 to saturate. This detection can be used to adjust the gain in the gain control 1154. Next, a change in the sample rate can be performed (1162) to reduce the amount of processing necessary. After resampling, correction for any mismatch in I, Q gain or non-orthogonality can be employed (via I/Q Correction module 1164). Additional interference can be cancelled in a digital interference canceller 1166. Information from the processing done by the analog cancellation unit 1146 can be used (as shown by the connection from FIG. 11b) by the digital interference cancellation unit 1166. This can more accurately (as compared to the analog interference canceller 1146) remove interference from near targets, including the bumper. Further interference cancellation (with large target canceller 1168) can be done to minimize the effect of sidelobes of a near target on the detectability of a further target. Interference from other radar systems, such as an FMCW system, can also be incorporated (such as FMCW/Tone Canceller 1170) into the digital processing. The resulting information is stored in a buffer 1174. This allows all digital processing to be suspended temporarily in order to not create unwanted radio frequency interference from the digital processing. Finally, the signal is processed by correlating with a correlator 1176, with delayed versions of the code from the code generator (1102). The correlator(s) 1176 could be implemented in a number of ways including a matched filter and an FFT-based approach. The samples of the output of the correlator or matched filter (1176) are stored in memory as radar data cubes (RDC), such as RDC1 (1178). The correlation values for different delays, different receivers, and different times are stored in the radar data cube. The information from RDC1 is processed further to determine object velocity and angle (e.g., azimuth or elevation or both). The information from the correlators for one scan may be stored in different parts of the radar data cube so that data can be written in one part of the memory RDC1 and used for Doppler and angle processing while other parts of the memory corresponding to different scans are being read for Doppler and angle processing. The sizes of these different parts of the memory can be different, corresponding to different performance objectives. Further software control of the processing of information stored in RDC1 may be performed to determine the velocity of targets.

Figure 11D:
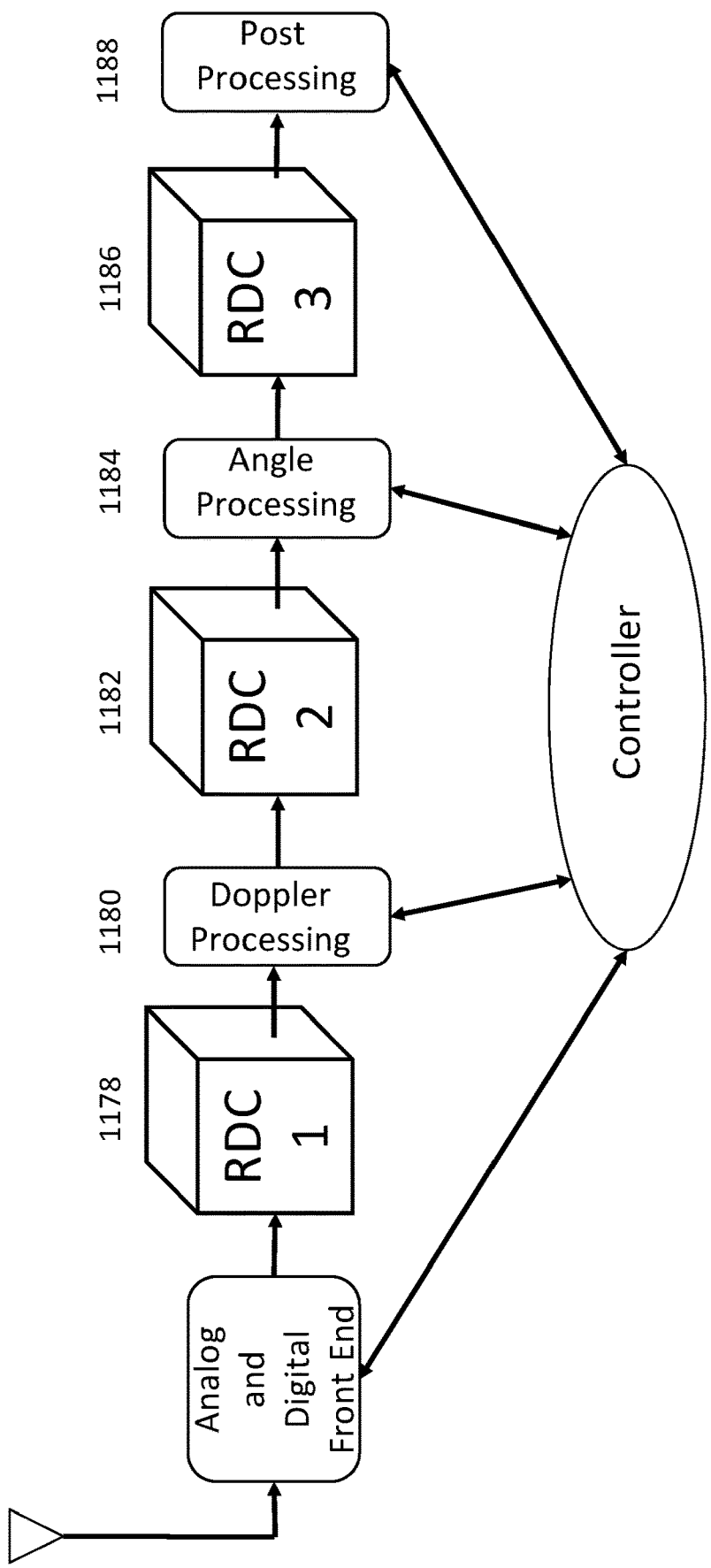

FIG. 11d illustrates the back-end digital processing. The front-end analog and digital processing, illustrated in FIGS. 11a-c, processes the received signal and stores the processed information (complex signals) in the radar data cube 1 (RDC1). The information is related to signals reflected from objects as a function of time (one of the dimensions) at various distances (a second dimension) and for various receivers (a third dimension). Information from various receivers is stored in a common memory. To determine the velocity of an object, a particular "slice" of the radar data cube is processed. A slice of a cube refers to a two-dimensional subset of the data where one of the variables (either range, time, or receiver) is fixed. Processing can also be done on the information with the range and Doppler fixed. In this case, the data is one dimensional and is known as a skewer. The slice of RDC1 where range is fixed, and the virtual receiver is fixed, but the sequence of correlation values for different times are varied, can be used to calculate a Doppler shift. By taking the fast Fourier transform of RDC1, with respect to the time dimension, the Doppler at a given range, and for a given virtual receiver, can be determined. This information is stored in radar data cube 2 (RDC2). The Doppler processing (1180) has as input of time samples and performs a Fourier transform processing (e.g., FFT, DFT or channelizer) to generate Doppler information stored in RDC2 (1182). The time samples can be windowed as needed or zero padded, depending on the radar system objective and/or external inputs. One type of windowing is a rectangular window which allows for accurately estimating the peak of strong signals at the expense of poorer sidelobe suppression. A Dolph-Checyshev windowing supports greater side-lobe suppression to allow detection of weaker signals that would otherwise be hidden by the side-lobes of the stronger signals. The signal samples can also be padded to obtain better Doppler sampling granularity. The window used and the padding employed are fully controllable from the control processor. Radar data cube 2 (RDC2) stores complex samples in three dimensions: range, Doppler, and virtual receiver.

The next step in processing the data is using the RDC2 information to calculate the angle of arrival for a particular range and a particular Doppler shift. This is done in angle processor 1184. The resulting information is stored in RDC3 which has dimensions corresponding to range, Doppler, and angle (azimuth and/or elevation). The angle of arrival processing (1184) does a beam forming type of algorithm on the RDC2 data as a function of the virtual receiver. The angle processor does beam forming using a steering vector to weight the different receiver outputs and combine the weighted outputs. The beam forming used will depend on the particular set of antennas employed, as configured by the control processor. Aspects of such beam forming are also discussed in U.S. patent application Ser. No. 15/496,038, filed concurrently with the present patent application, and titled SOFTWARE DEFINED AUTOMOTIVE RADAR ("the '038 patent application"), which is hereby incorporated by reference herein in its entirety.

Since the antennas are switchable, the angle of arrival calculation is dependent on the selection of antennas. Storage of information in RDC2 and RDC3 can be implemented with a first in, first out (FIFO) buffer where all the information associated with a particular scan (e.g., range, Doppler and virtual receiver) are not necessarily stored simultaneously but are being written into the FIFO while other information is being read out.

The analog processing of the received signal from the antenna to the ADC is called the analog front end. The processing of digital signals from the ADC to RDC1 is called the digital front end. The control of these operations is done by a processor as described in the '038 patent application, incorporated above.

The same processor controls the further processing of signals from RDC1 to RDC3 and then post RDC3 processing. This processing of digital signals from the RDC1 to generate Doppler information and angle information, along with the range information already determined, which is stored in radar data cube 3 (RDC3), is called the digital back end.

As mentioned above, the signals to be used for transmitting, and the receiver processing to be employed, depend on a number of different factors including the environment (e.g., an urban area, suburban area, parking lot, garage, construction zone etc.). Different, changing objectives for the radar system might be desired (e.g., small range resolution, small velocity resolution, small angular resolution, etc.). Different types of interference might be present in the radar system (e.g., FMCW radars, PMCW radars, etc.). Therefore, it is desirable to be able to dynamically adapt the radar to different environments, different objectives, different performance objectives, different external inputs, and different types of interference. Embodiments of the present invention provide for a software controllable adaptable radar system.

Radar Data Compression

In a radar system, Doppler processing typically comprises performing a fast Fourier transform (FFT) using a sufficiently long time series of complex data at the input to the FFT. This Doppler processing is performed independently on multiple time series, captured simultaneously by multiple virtual receivers for multiple range bins. However, the entire time series must be available before FFT processing can begin. This requires partial time series to be stored in memory as the points of the time series are captured, which can result in a large amount of memory being used. To enable longer scans, or scans with more virtual receivers, or more range bins, and using a limited amount of memory, it is desirable to first compress the time series as they are captured, then store the compressed representations in memory, and once they are fully captured, decompress them prior to performing Doppler processing on them. The compression should be lossless to avoid introducing compression artifacts into the data. There are various lossless compression algorithms that can be employed. For example, MPEG4-audio lossless coding (MPEG4-ALS) is one compression standard that has various parameters that can change the amount of compression and change the complexity of the algorithm. In MPEG4-ALS, data is the input to a predictor. The difference between the predicted value and the actual value is compressed using a form of entropy coding. Data may be optionally converted from complex in-phase and quadrature (I/Q) format to phase angle and magnitude format prior to the prediction step. After prediction, residual values (the difference between the predicted value and the actual value) are compressed using an arithmetic or entropy encoding algorithm. Within a given range bin, predictors predict samples of data based on the value of samples from adjacent virtual receivers (to either side of the sample being predicted), and from previous time samples for the same virtual receiver. Inter-range bin prediction may also be used. The compression of data that is stored in RDC1 (for later Doppler processing) is controlled by software and can be adapted to achieve certain objectives, such as processing time and memory requirements.

Compensating for Doppler Shift:

Doppler shift has an adverse effect on a radar system's ability to correlate a received signal with various delayed or shifted versions of the transmitted signal to determine range. Because the phase of the received signal rotates due to Doppler shift, the magnitude of the peak corresponding to the delay of a target (so called zero-shift) decreases with increasing Doppler. Also, the average magnitude of the non-zero-shift "sidelobes" increases with increasing Doppler. The effect is that the SNR for the target in question is reduced and the SNR for all targets in all other range bins (non-zero shifts) decreases because the noise or interference from one target is now spread over different range bins. Naturally, largest target(s) cause the largest sidelobes. The present invention incorporates a method and device for compensating for Doppler shift, comprising:

a. Identifying a set of the largest (highest received signal) targets;

b. Estimating the Doppler velocity for the largest targets using a median, a weighted arithmetic mean, or a weighted geometric mean of the Doppler for several adjacent range bins that correspond to the target;

c1. Calculating the phase shift, $\phi_1$, from one complex correlator input sample to the next complex correlator input sample, corresponding to the estimated Doppler velocity; and/or c2. Calculating the phase shift, $\phi_2$, from one complex correlator output sample to the next complex correlator output sample, corresponding to the estimated Doppler velocity; and d. Derotating the Nth complex (pre or post correlator) sample by $N*\phi_1$ or $N*\phi_2$.

A processor controls the identification of the set of largest targets. In the case of a single large target, no additional memory is required. In the case of two or more large targets, multiple (full or partial) RDC1 cubes are required. The processor also controls the estimation of the Doppler of the large target(s).

On Demand Multi-Scan Micro-Doppler:

In a radar system, achieving high Doppler resolution requires long scans. Practical limitations on the length of a scan, such as memory usage, and the desire to obtain frequent updates from the radar, limit the maximum achievable Doppler resolution in a single scan. Typical scans may be able to achieve Doppler resolutions of up to 0.1 meters/second. A system and methods for achieving high resolution Doppler measurements for selected targets by combining information from multiple scans is described in detail in U.S. Pat. No. 9,599,702.

While memory considerations prevent saving the entire raw radar data cube ('RDC1') from multiple scans, it is possible to identify and save only a subset of the data cube (e.g., a small subset of the range bins), the subset comprising a time series of complex valued samples of the signal from each virtual receiver for the range bin, or bins, of interest.

Once the data for a particular range bin (or bins) has been saved to memory for multiple consecutive scans, using the same scan parameters, micro-Doppler post processing can be performed, comprising the steps of concatenating or joining or linking each time series, optionally inserting zeros in the time series to compensate for any delays between scans, performing a fast Fourier transform (FFT) on each time series to convert them from the time domain to the Doppler frequency domain (or alternatively using a channelizer), followed by any angle-of-arrival processing (e.g., beamforming or angle super-resolution) that may be desired. The decision about when to perform such multi-scan processing and for which range bins to process is controlled a processor.

Fully Pipelined Architecture:

The present invention provides a fully reconfigurable, pipelined radar architecture, which allows the user to perform different radar scans for different use case scenarios while keeping the memory requirements fairly small. Aspects of such pipelined radar architecture are described in the '038 patent application, incorporated above. The architecture comprises:

1. A programmable PRN generator for non-periodic (PRBS based codes) and periodic codes (with support for Hadamard Matrix). The PRN generator supports switching of periodic codes for each FFT point as well as constructing PRBS sequences based on fully configurable HW generated PRBS sequences.
2. Fascia reflection self-Interference mitigation. Self-interference mitigation is discussed in U.S. patent application Ser. No. 15/496,314, filed concurrently with the present application and titled VEHICULAR RADAR SYSTEM WITH SELF-INTERFERENCE CANCELLATION, now U.S. Pat. No. 9,791,551, which is hereby incorporated by reference herein in its entirety.
3. FIR decimation (Reduce frequency from 2 GHz to 75 MHz)/FIR range walking/FMCW canceler.
4. An FFT based correlator for range bins.
5. A Correction engine for successive cancelation as well as amplitude and phase correction.
6. Compression/de-compression of a radar data cube (time samples).
7. FFT channelizers or Doppler processing.
8. Angle of arrival computation (delay and sum/FFT).
9. Decimation to store only relevant information out of the radar data cube.

Only items 4 and 5 require a full radar data cube (RDC1). The steps afterwards require a much smaller temporary storage since the computations are done more or less in flight. The processing of the radar data cube is in general done faster compared to the accumulation of the new radar data cube to ensure minimal memory overhead. The control processor controls these operations.

Ghost Interference Removal:

In a PMCW radar, mitigation of the adverse effects of interference from other PMCW radars is difficult because, without knowledge of the exact code and carrier frequency used by the interfering radar, there is no straightforward way to suppress the interference. The spectrum spreading caused by the interfering radar's use of pseudo-random code sequences results in an elevated noise floor, which in turn reduces a radar's ability detect weak targets.

The present invention proposes a method and device to isolate and suppress the interference from another PMCW radar using periodic spreading codes, comprising the steps of: using a first periodic code with the same period as the interfering PMCW radar (but not necessarily the same code, or the same carrier frequency), capturing a first N time samples (aka: FFT points), then repeating with a second periodic code with the same period as first periodic code, and capturing a second N time samples, optionally repeating this process one or more additional times for a total of K times, and then performing Doppler processing on each of the K sets of N time samples to compute K frequency spectrums. The control processor compares the frequency spectrums and identifies the peaks (the "inconsistent signals") whose magnitude varies across the K frequency spectrums and the peaks (the "true signals") whose magnitude remains constant (or nearly so) across the K frequency spectrums. The control processor modifies or instructs the hardware to modify all captured time samples to remove frequencies that correspond to the inconsistent signals. Finally, a single FFT is performed over all K*N modified samples. This technique has been shown to lower the noise floor by 20 dB or more. Methods for mitigating interference from other PMCW radars is discussed in U.S. patent application, Ser. No. 15/416,219, filed Jan. 26, 2017, now U.S. Pat. No. 9,772,397, which is hereby incorporated by reference herein in its entirety.

The control processor identifies the existence of one or more interfering radars. The control processor also controls the type of spreading codes being used (the period, the type, etc.). Lastly, the control processor also controls the choice of K and N used for interference estimation.

Memory Reduction by Beamforminq and Decimation/Sparsification:

The present invention provides a method and device for reducing the amount of post Doppler processing data, in a phased array radar system that must be stored to memory for performing subsequent processing. The method comprises the steps of:

- Performing spatial windowing and beamforming (e.g., delay and sum) on one or more input (complex) sample vectors from RDC2 for a given range and Doppler for various virtual receivers to produce output complex sample vectors (RDC3) for the corresponding range and Doppler and angle.
- The control processor identifies a region of samples in RDC3. In a preferred embodiment, this region corresponds to a band of low absolute velocity that includes ground clutter.
- Samples of RDC3 in the identified band are stored in a separate memory buffer called a static slice. The samples in the identified band are tagged as being included in the static slice. The complete set of RDC3 samples are processed by a decimator/sparsifier.
- For each untagged sample in RDC3, the decimator/sparsifier compares the magnitude of the sample to one or more thresholds configured by the control processor. Depending on the outcome of the comparison, a set of samples, including the sample, are stored in one of one or more distinct memory buffers. Preferably, the set of samples are samples with similar Doppler, range and/or angle (azimuth and/or elevation). In the preferred embodiment, the set includes all samples with the same range and Doppler. These buffers are called the sparsified RDC3 (sRDC3). In a preferred embodiment, different thresholds may be configured for different range bins. In another preferred embodiment, the thresholds are determined by analyzing histograms of RDC3 sample magnitudes. Different histograms may be computed for different subsets of RDC3 (e.g., one histogram per range bin).
- The samples stored in the static slice or the sparsified RDC3 (sRDC3) may be stored as complex numbers (real and imaginary part), magnitude only, or both. Which mechanism to store is determined by the control processor.

The above steps of processing are controlled by the control processor in order to achieve the performance objectives.

Asynchronous, Parallel, Memory Efficient MUSIC Engine:

The present invention provides a method and device for performing adaptive on-demand super resolution angle-of-arrival (AoA) processing on a subset of the range, Doppler, angle space (i.e., a subset of RDC3), comprising the steps of:

- Using a control processor to analyze the static slice and sRDC3 to identify regions of interest. In a preferred embodiment, the region of interest is a local maximum of the magnitude of the samples. The control processor tracks regions of interest over time including multiple scans.
- Using a control processor to choose a subset of range, Doppler, angle space based on past and current samples of the static slice and/or sRDC3 in the regions of interest, in which to perform super resolution angle of arrival processing.
- Using a control processor to select a subset of the range bins of RDC1 on which to perform Doppler processing. In the preferred embodiment, the Doppler processing is performed by a channelizer. Using a control processor to select a subset of the Doppler bins (channels) to perform super resolution processing.
- Using a control processor to configure a MUSIC engine to provide super resolution processing on the subset of range, Doppler, and angle space. In preferred embodiment, the configuration includes spatial smoothing steps, parameters for singular value decomposition (SVD) calculation (e.g., a maximum number of iterations and precision threshold), an estimated number of signal eigenvectors, and steering vector matrix). In the preferred embodiment, the control processor configures the MUSIC engine by providing commands and parameters through a FIFO.
- Using a MUSIC (MUltiple SIgnal Classification) Engine configured by the control processor to determine location of peaks in the angular dimension for the specified subset of range, Doppler, and angle space, comprising the steps of:
  - Calculating a sample covariance matrix from one or more samples of input data.
  - Performing spatial smoothing on the covariance matrix.
  - Calculating the singular value decomposition of the covariance matrix.
  - Using the singular values to estimate the number of signals.
  - Using a sub-matrix of the left unitary matrix (representing the noise subspace) to compute the MUSIC spectrum over a specified range of angles.
  - Writing to an output FIFO a list of angles corresponding to peaks of the MUSIC spectrum occurring in the specified range of angle.

Compressing Range Bins Dynamically and Adaptively (Variable Range Bins):

In case of a PMCW-based radar system, range bins are used to identify how far objects are from the radar. The range bin resolution is usually linear, which means if the range bin resolution is 0.1 m, then 900 range bins are required for a distance of 10-100 m. This results in a large radar cube overhead. The larger the distance, the larger can be the range resolution. The range bins can be compressed, assuming for example that the range resolution can be 1 percent of the distance, which means at 10 m the range resolution is 0.1 m, at 20 m it is 0.2 m, at 30 m it is 0.3 m, and so on. If variable range bins are used, several range bins can be combined to a single range bin when the object is far away, thereby effectively reducing the total number of required range bins.

This approach can also be used to reduce the number of total range bins if object locations are known or object positions are being tracked. Assume for example, that the range between 10-100 m is using a range resolution of 2.5 m, which implies 36 range bins. And as soon as a range bin contains objects to be tracked, only that quadrant is used, with higher resolution range bins. The present invention uses a control processor to configure the resolution around tracked objects with much higher resolution compared to the areas without objects.

The system thus has reduced memory requirements by compressing several range bins into a single range bin using a configurable variable range bin parameter on a per range bin basis. Care is needed prior to aggregating range bins as the SNR will be negatively impacted. For close objects and near empty ranges, this is likely a good trade off. The control processor controls the ranges and resolutions that are correlated with by the pipeline processing.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system for a vehicle, the radar sensing system comprising:
an adaptable transmitter configured for installation and use on a vehicle, and configured to transmit radio signals;
an adaptable receiver configured for installation and use on the vehicle, and configured to receive radio signals, wherein the received radio signals include transmitted radio signals transmitted by the transmitter and reflected from objects in an environment;
a control unit configured to adaptively control a variable operation of at least one of the transmitter and the receiver in response to changing performance objectives, wherein the performance objectives are defined by environmental conditions and functional requirements, wherein the functional requirements are defined by at least one of processing limitations and memory limitations;
wherein the environmental conditions comprise self-interference when the received radio signals comprise radio signals transmitted by the transmitter and reflected off a bumper of the vehicle, and received by the receiver, and wherein a level of the self-interference is dependent upon an installation location of the transmitter in the vehicle; and
wherein the receiver is adapted to process the received radio signals as controlled by the control unit, and wherein the control unit is configured to select an operational configuration for the receiver, and wherein the selected operational configuration of the receiver is in response to the changing performance objectives.

2. The radar sensing system of claim 1, wherein the receiver comprises an adaptable digital front end processor and an adaptable digital back end processor, and wherein the control unit is configured to select an operational configuration for the digital front end processor and an operational configuration for the back end processor by selecting the operational configuration for the receiver.

3. The radar sensing system of claim 1, wherein the environmental conditions are determined by at least one of the radar sensing system itself and external sources, and wherein the external sources include communications received from any one or more of other radar sensing systems, other vehicles, cellular networks, and GPS receiver systems.

4. The radar sensing system of claim 1, wherein the environmental conditions comprise at least one of urban areas, suburban areas, rural areas, desert areas, parking lots, parking structures or garages, construction zones, and at least one of time of day and weather conditions.

5. The radar sensing system of claim 4, wherein the control unit reconfigures at least one of the transmitter and the receiver for a performance objective as defined by a current environmental condition, and wherein the performance objective includes at least one of an optimized range resolution, an optimized velocity resolution, an optimized angle-of-arrival resolution, an optimized memory allocation, and an optimized range bin resolution for at least a portion of a plurality of range bins.

6. The radar sensing system of claim 1, wherein the receiver comprises an analog interference cancellation unit configured to cancel self-interference such that the transmitted signal transmitted by the transmitter and reflected off the bumper of the vehicle is eliminated from the received radio signals, and wherein the control unit is configured to activate the analog interference cancellation unit when the level of the self-interference is above a threshold.

7. The radar sensing system of claim 1, wherein the environmental conditions comprise interference when the received radio signals comprise interfering radio signals transmitted by another radar sensing system, and wherein the interference is defined by the type of signal transmitted by the another radar sensing system.

8. The radar sensing system of claim 7, wherein the control unit reconfigures at least one of the transmitter and the receiver to eliminate and/or mitigate the interfering radio signals, and wherein the reconfiguration is defined by the type of signal transmitted by the another radar sensing system.

9. The radar sensing system of claim 1, wherein the functional requirements comprise at least one of a selected processing time, a memory requirement, a selected range bin resolution, and a selected quantity of range bins.

10. The radar sensing system of claim 9, wherein the control unit is configured to reconfigure the receiver such that a first selected quantity of range bins comprises a first selected resolution and a second selected quantity of range bins comprises a second selected resolution that is lower than the first selected resolution.

11. The radar sensing system of claim 1 further comprising a memory, wherein data produced by the receiver from the received radio signals is stored in the memory, and wherein the control unit controls the processing of the stored data based upon the selected operation configuration of the receiver.

12. The radar sensing system of claim 11, wherein the control unit is configured to control an operation of the receiver to process range information from the received radio signals, and wherein the receiver is reconfigured to:
select an object for which a better Doppler estimation is desired;
store multiple time scans corresponding to a range of a desired object; and
perform Doppler processing on extended information from multiple scans to obtain more precise Doppler information.

13. A method for operating a dynamically adaptable vehicular radar sensing system, the method comprising:
providing an adaptable transmitter configured for installation and use on a vehicle;
providing an adaptable receiver configured for installation and use on the vehicle;
providing a memory configured for storing data processed by the receiver;
transmitting, with the transmitter, modulated radio signals;
receiving, with the receiver, radio signals, wherein the received radio signals include at least one of: transmitted radio signals transmitted by the transmitter and reflected from objects in an environment, and radio signals transmitted by another radar sensing system;
adaptively controlling an operation of at least one of the transmitter and the receiver in response to changing performance objectives, wherein the performance objectives are defined by environmental conditions and functional requirements, wherein the functional requirements are defined by at least one of processing limitations and memory limitations;
wherein the environmental conditions comprise self-interference when the received radio signals include radio signals transmitted by the transmitter and reflected off of a bumper of the vehicle, and received by the receiver, and wherein a level of the self-interference is dependent upon an installation location of the transmitter in the vehicle;

processing, with the receiver, the received radio signals as defined by a selected operational configuration for the receiver, and wherein the selected operational configuration of the receiver is in response to the changing performance objectives.

14. The method of claim 13, wherein the environmental conditions are determined by at least one of the radar sensing system itself and external sources, and wherein the external sources include communications received from any one or more of other radar sensing systems, other vehicles, cellular networks, and GPS receiver systems.

15. The method of claim 13, wherein the environmental conditions comprise at least one of urban areas, suburban areas, rural areas, desert areas, parking lots, parking structures or garages, construction zones, and at least one of time of day and weather conditions.

16. The method of claim 15 further comprising reconfiguring at least one of the transmitter and the receiver for a performance objective as defined by a current environmental condition, and wherein the performance objective includes one of an optimized range resolution, an optimized velocity resolution, an optimized angle-of-arrival resolution, and an optimized range bin resolution for at least a portion of a plurality of range bins.

17. The method of claim 13 further comprising activating an analog interference cancellation unit of the receiver when the level of the self-interference is above a threshold, wherein the analog interference cancellation unit cancels the self-interference such that the transmitted signal transmitted by the transmitter and reflected off a bumper of the vehicle is eliminated from the received radio signals.

18. The method of claim 13, wherein the environmental conditions comprise interference when the received radio signals include radio signals transmitted by another radar sensing system, wherein the interference is defined by the type of signal transmitted by the another radar sensing system, wherein the method further comprises reconfiguring at least one of the transmitter and the receiver to eliminate and/or mitigate the interfering radio signals, and wherein the reconfiguration is defined by the type of signal transmitted by the another radar sensing system.

19. The method of claim 13 further comprising controlling an operation of the receiver to process range information from the received radio signals, wherein the receiver is reconfigured to:

select an object for which a better Doppler estimation is desired;

store multiple time scans corresponding to a range of a desired object; and perform Doppler processing on extended information from multiple scans to obtain more precise Doppler information.

20. The method of claim 13, wherein the functional requirements comprise at least one of a selected processing time, a memory requirement, a selected range bin resolution, and a selected quantity of range bins.

21. The method of claim 20, wherein the receiver is reconfigured such that a first selected quantity of range bins comprises a first selected resolution, and a second selected quantity of range bins comprises a second selected resolution that is smaller than the first selected resolution.

* * * * *

UNITED STATES PATENT AND TRADEMARK OFFICE
CERTIFICATE OF CORRECTION

PATENT NO. : 11,086,010 B2
APPLICATION NO. : 16/207910
DATED : August 10, 2021
INVENTOR(S) : Curtis Davis et al.

It is certified that error appears in the above-identified patent and that said Letters Patent is hereby corrected as shown below:

In the Specification

Column 7
Line 59, "$\pi c/2$" should be --$\tau c/2$--

Signed and Sealed this
Twenty-second Day of April, 2025

Coke Morgan Stewart
*Acting Director of the United States Patent and Trademark Office*